US010289264B2

(12) United States Patent
Gueziec et al.

(10) Patent No.: US 10,289,264 B2
(45) Date of Patent: *May 14, 2019

(54) CONTROLLING A THREE-DIMENSIONAL VIRTUAL BROADCAST PRESENTATION

(71) Applicant: Uber Technologies, Inc., San Francisco, CA (US)

(72) Inventors: Andre Gueziec, Sunnyvale, CA (US); Briac Blanquart, San Francisco, CA (US)

(73) Assignee: Uber Technologies, Inc., San Francisco, CA (US)

( * ) Notice: Subject to any disclaimer, the term of this patent is extended or adjusted under 35 U.S.C. 154(b) by 155 days.

This patent is subject to a terminal disclaimer.

(21) Appl. No.: 15/270,916

(22) Filed: Sep. 20, 2016

(65) Prior Publication Data

US 2017/0031561 A1 Feb. 2, 2017

Related U.S. Application Data

(63) Continuation of application No. 14/100,985, filed on Dec. 9, 2013, now Pat. No. 9,448,690, which is a (Continued)

(51) Int. Cl.
*G06F 3/01* (2006.01)
*G06F 3/0482* (2013.01)
(Continued)

(52) U.S. Cl.
CPC .......... *G06F 3/04815* (2013.01); *G06F 3/016* (2013.01); *G06F 3/0482* (2013.01);
(Continued)

(58) Field of Classification Search
CPC .. G06F 3/016; G06F 3/04815; G06F 3/04817; G06F 3/0482; G06F 3/167;
(Continued)

(56) References Cited

U.S. PATENT DOCUMENTS

| | | | |
|---|---|---|---|
| 4,734,863 A | 3/1988 | Honey et al. | |
| 4,788,645 A | 11/1988 | Zavoli et al. | |

(Continued)

FOREIGN PATENT DOCUMENTS

| | | | |
|---|---|---|---|
| CA | 2688129 A1 | 9/2010 | |
| CA | 2811517 A1 | 3/2012 | |

(Continued)

OTHER PUBLICATIONS

US 9,019,260 B2, 04/2015, Gueziec (withdrawn)

(Continued)

*Primary Examiner* — Sing-Wai Wu
(74) *Attorney, Agent, or Firm* — Schwegman Lundberg & Woessner, P.A.

(57) ABSTRACT

Control of a three-dimensional virtual broadcast presentation is disclosed. The three-dimensional virtual broadcast presentation may be generated based on dynamic information such as traffic information, weather information, or other information that may be featured on a three-dimensional virtual broadcast presentation. A signal generated by a control device maneuvered by a presenter and reflecting positional information of the control device is received. A view of the three-dimensional virtual broadcast presentation is manipulated in response to the received signal, the manipulation of the virtual broadcast presentation at least partially based on positional information of the control device.

20 Claims, 6 Drawing Sheets

Related U.S. Application Data continuation of application No. 12/398,120, filed on Mar. 4, 2009, now Pat. No. 8,619,072.

(51) Int. Cl.
  *G06T 19/00* (2011.01)
  *H04H 20/55* (2008.01)
  *H04H 60/70* (2008.01)
  *G06F 3/0481* (2013.01)
  *H04H 60/71* (2008.01)
  *H04N 5/222* (2006.01)
  *H04N 5/262* (2006.01)
  *G06F 3/16* (2006.01)

(52) U.S. Cl.
  CPC .......... *G06F 3/04817* (2013.01); *G06F 3/167* (2013.01); *G06T 19/006* (2013.01); *H04H 20/55* (2013.01); *H04H 60/70* (2013.01); *H04H 60/71* (2013.01); *H04N 5/2224* (2013.01); *H04N 5/262* (2013.01)

(58) Field of Classification Search
  CPC ...... G06T 19/006; H04H 20/55; H04H 60/70; H04H 60/71; H04N 5/2224; H04N 5/262
  See application file for complete search history.

(56) References Cited

U.S. PATENT DOCUMENTS

| | | |
|---|---|---|
| 4,792,803 A | 12/1988 | Madnick et al. |
| 4,796,191 A | 1/1989 | Honey et al. |
| 4,878,170 A | 10/1989 | Zeevi |
| 4,914,605 A | 4/1990 | Longhmiller, Jr. et al. |
| 4,926,343 A | 5/1990 | Tsuruta et al. |
| 5,068,656 A | 11/1991 | Sutherland |
| 5,086,510 A | 2/1992 | Guenther et al. |
| 5,095,532 A | 3/1992 | Mardus |
| 5,126,941 A | 6/1992 | Gurmu et al. |
| 5,164,904 A | 11/1992 | Sumner |
| 5,173,691 A | 12/1992 | Sumner |
| 5,182,555 A | 1/1993 | Sumner |
| 5,220,507 A | 6/1993 | Kirson |
| 5,247,439 A | 9/1993 | Gurmu et al. |
| 5,262,775 A | 11/1993 | Tamai et al. |
| 5,276,785 A | 1/1994 | Mackinlay et al. |
| 5,283,575 A | 2/1994 | Kao et al. |
| 5,291,412 A | 3/1994 | Tamai et al. |
| 5,291,413 A | 3/1994 | Tamai et al. |
| 5,291,414 A | 3/1994 | Tamai et al. |
| 5,297,028 A | 3/1994 | Ishikawa |
| 5,297,049 A | 3/1994 | Gurmu et al. |
| 5,303,159 A | 4/1994 | Tamai et al. |
| 5,311,195 A | 5/1994 | Mathis et al. |
| 5,311,434 A | 5/1994 | Tamai |
| 5,339,246 A | 8/1994 | Kao |
| 5,343,400 A | 8/1994 | Ishikawa |
| 5,345,382 A | 9/1994 | Kao |
| 5,359,529 A | 10/1994 | Snider |
| 5,374,933 A | 12/1994 | Kao |
| 5,377,113 A | 12/1994 | Shibazaki et al. |
| 5,390,123 A | 2/1995 | Ishikawa |
| 5,394,333 A | 2/1995 | Kao |
| 5,402,120 A | 3/1995 | Fujii et al. |
| 5,414,630 A | 5/1995 | Oshizawa et al. |
| 5,428,545 A | 6/1995 | Maegawa et al. |
| 5,430,655 A | 7/1995 | Adachi |
| 5,440,484 A | 8/1995 | Kao |
| 5,465,079 A | 11/1995 | Bouchard et al. |
| 5,477,220 A | 12/1995 | Ishikawa |
| 5,485,161 A | 1/1996 | Vaughn |
| 5,488,559 A | 1/1996 | Seymour |
| 5,499,182 A | 3/1996 | Ousborne |
| 5,504,482 A | 4/1996 | Schreder |
| 5,508,931 A | 4/1996 | Snider |
| 5,515,283 A | 5/1996 | Desai |
| 5,515,284 A | 5/1996 | Abe |
| 5,539,645 A | 7/1996 | Mandhyan et al. |
| 5,546,107 A | 8/1996 | Deretsky et al. |
| 5,548,822 A | 8/1996 | Yogo |
| 5,550,538 A | 8/1996 | Fujii et al. |
| 5,554,845 A | 9/1996 | Russell |
| 5,583,972 A | 12/1996 | Miller |
| 5,608,635 A | 3/1997 | Tamai |
| 5,610,821 A | 3/1997 | Gazis et al. |
| 5,689,252 A | 11/1997 | Ayanoglu et al. |
| 5,694,534 A | 12/1997 | White, Jr. et al. |
| 5,699,056 A | 12/1997 | Yoshida |
| 5,706,503 A | 1/1998 | Poppen et al. |
| 5,712,788 A | 1/1998 | Liaw et al. |
| 5,729,458 A | 3/1998 | Poppen |
| 5,731,978 A | 3/1998 | Tamai et al. |
| 5,742,922 A | 4/1998 | Kim |
| 5,751,245 A | 5/1998 | Janky et al. |
| 5,751,246 A | 5/1998 | Hertel |
| 5,757,359 A | 5/1998 | Morimoto et al. |
| 5,774,827 A | 6/1998 | Smith et al. |
| 5,818,356 A | 10/1998 | Schuessler |
| 5,822,712 A | 10/1998 | Olsson |
| 5,842,142 A | 11/1998 | Murray et al. |
| 5,845,227 A | 12/1998 | Peterson |
| 5,850,190 A | 12/1998 | Wicks et al. |
| 5,862,244 A | 1/1999 | Kleiner et al. |
| 5,862,509 A | 1/1999 | Desai et al. |
| 5,864,305 A | 1/1999 | Rosenquist |
| 5,867,110 A | 2/1999 | Naito et al. |
| 5,893,081 A | 4/1999 | Poppen |
| 5,893,898 A | 4/1999 | Tanimoto |
| 5,898,390 A | 4/1999 | Oshizawa et al. |
| 5,902,350 A | 5/1999 | Tamai et al. |
| 5,904,728 A | 5/1999 | Tamai et al. |
| 5,908,464 A | 6/1999 | Kishigami et al. |
| 5,910,177 A | 6/1999 | Zuber |
| 5,911,773 A | 6/1999 | Mutsuga et al. |
| 5,912,635 A | 6/1999 | Oshizawa et al. |
| 5,916,299 A | 6/1999 | Poppen |
| 5,922,042 A | 7/1999 | Sekine et al. |
| 5,928,307 A | 7/1999 | Oshizawa et al. |
| 5,931,888 A | 8/1999 | Hiyokawa |
| 5,933,100 A | 8/1999 | Golding |
| 5,938,720 A | 8/1999 | Tamai |
| 5,948,043 A | 9/1999 | Mathis et al. |
| 5,978,730 A | 11/1999 | Poppen et al. |
| 5,982,298 A | 11/1999 | Lappenbusch et al. |
| 5,987,381 A | 11/1999 | Oshizawa et al. |
| 5,991,687 A | 11/1999 | Hale et al. |
| 5,999,882 A | 12/1999 | Simpson et al. |
| 6,009,374 A | 12/1999 | Urahashi |
| 6,011,494 A | 1/2000 | Watanabe et al. |
| 6,016,485 A | 1/2000 | Amakawa et al. |
| 6,021,406 A | 2/2000 | Kuznetsov |
| 6,038,509 A | 3/2000 | Poppen et al. |
| 6,058,390 A | 5/2000 | Liaw et al. |
| 6,064,970 A | 5/2000 | McMillan et al. |
| 6,091,359 A | 7/2000 | Geier |
| 6,091,956 A | 7/2000 | Hollenberg |
| 6,097,399 A | 8/2000 | Bhatt et al. |
| 6,111,521 A | 8/2000 | Mulder et al. |
| 6,144,919 A | 11/2000 | Ceylan et al. |
| 6,147,626 A | 11/2000 | Sakakibara |
| 6,150,961 A | 11/2000 | Alewine et al. |
| 6,161,092 A | 12/2000 | Latshaw et al. |
| 6,169,552 B1 | 1/2001 | Endo et al. |
| 6,188,956 B1 | 2/2001 | Walters |
| 6,209,026 B1 | 3/2001 | Ran et al. |
| 6,222,485 B1 | 4/2001 | Walters et al. |
| 6,226,591 B1 | 5/2001 | Okumura et al. |
| 6,236,933 B1 | 5/2001 | Lang |
| 6,253,146 B1 | 6/2001 | Hanson et al. |
| 6,253,154 B1 | 6/2001 | Oshizawa et al. |
| 6,256,577 B1 | 7/2001 | Granuke |
| 6,259,987 B1 | 7/2001 | Ceylan et al. |
| 6,282,486 B1 | 8/2001 | Bates et al. |
| 6,282,496 B1 | 8/2001 | Chowdhary |

(56) References Cited

U.S. PATENT DOCUMENTS

| | | |
|---|---|---|
| 6,292,745 B1 | 9/2001 | Robare et al. |
| 6,295,492 B1 | 9/2001 | Lang et al. |
| 6,297,748 B1 | 10/2001 | Lappenbusch et al. |
| 6,298,305 B1 | 10/2001 | Kadaba et al. |
| 6,317,685 B1 | 11/2001 | Kozak et al. |
| 6,317,686 B1 | 11/2001 | Ran |
| 6,335,765 B1 | 1/2002 | Daly et al. |
| 6,353,795 B1 | 3/2002 | Ranjan |
| 6,356,836 B1 | 3/2002 | Adolph |
| 6,360,165 B1 | 3/2002 | Chowdhary |
| 6,360,168 B1 | 3/2002 | Shimbara |
| 6,362,778 B2 | 3/2002 | Neher |
| 6,415,291 B2 | 7/2002 | Bouve et al. |
| 6,424,910 B1 | 7/2002 | Ohler et al. |
| 6,442,615 B1 | 8/2002 | Nordenstam et al. |
| 6,456,931 B1 | 9/2002 | Polidi et al. |
| 6,456,935 B1 | 9/2002 | Ng |
| 6,463,400 B1 | 10/2002 | Barkley-Yeung |
| 6,466,862 B1 | 10/2002 | DeKock et al. |
| 6,470,268 B1 | 10/2002 | Ashcraft et al. |
| 6,473,000 B1 | 10/2002 | Secreet et al. |
| 6,480,783 B1 | 11/2002 | Myr |
| 6,504,541 B1 | 1/2003 | Liu et al. |
| 6,526,335 B1 | 2/2003 | Treyz et al. |
| 6,529,143 B2 | 3/2003 | Mikkola et al. |
| 6,532,304 B1 | 3/2003 | Liu et al. |
| 6,539,302 B1 | 3/2003 | Bender et al. |
| 6,542,814 B2 | 4/2003 | Polidi et al. |
| 6,552,656 B2 | 4/2003 | Polidi et al. |
| 6,556,905 B1 | 4/2003 | Mittlelsteadt et al. |
| 6,559,865 B1 | 5/2003 | Angwin |
| 6,574,548 B2 | 6/2003 | DeKock et al. |
| 6,584,400 B2 | 6/2003 | Beardsworth |
| 6,594,576 B2 | 7/2003 | Fan et al. |
| 6,598,016 B1 | 7/2003 | Zavoli et al. |
| 6,600,994 B1 | 7/2003 | Polidi |
| 6,603,405 B2 | 8/2003 | Smith |
| 6,622,086 B2 | 9/2003 | Polidi |
| 6,639,550 B2 | 10/2003 | Knockheart et al. |
| 6,643,581 B2 | 11/2003 | Ooishi |
| 6,650,948 B1 | 11/2003 | Atkinson et al. |
| 6,650,997 B2 | 11/2003 | Funk |
| 6,654,681 B1 | 11/2003 | Kiendl et al. |
| 6,675,085 B2 | 1/2004 | Straub |
| 6,681,176 B2 | 1/2004 | Funk et al. |
| 6,687,615 B1 | 2/2004 | Krull et al. |
| 6,700,503 B2 | 3/2004 | Masar et al. |
| 6,710,774 B1 | 3/2004 | Kawasaki et al. |
| 6,720,889 B2 | 4/2004 | Yamaki et al. |
| 6,728,605 B2 | 4/2004 | Lash et al. |
| 6,728,628 B2 | 4/2004 | Peterson |
| 6,731,940 B1 | 5/2004 | Nagendran |
| 6,735,516 B1 | 5/2004 | Manson |
| 6,754,833 B1 | 6/2004 | Black et al. |
| 6,785,606 B2 | 8/2004 | DeKock et al. |
| 6,791,472 B1 | 9/2004 | Hoffberg |
| 6,807,483 B1 | 10/2004 | Chao et al. |
| 6,845,316 B2 | 1/2005 | Yates |
| 6,859,728 B2 | 2/2005 | Sakamoto et al. |
| 6,862,524 B1 | 3/2005 | Nagda et al. |
| RE38,724 E | 4/2005 | Peterson |
| 6,885,937 B1 | 4/2005 | Sunranyi |
| 6,901,330 B1 | 5/2005 | Krull et al. |
| 6,914,541 B1 | 7/2005 | Zierden |
| 6,922,629 B2 | 7/2005 | Yoshikawa et al. |
| 6,931,309 B2 | 8/2005 | Phelan et al. |
| 6,952,643 B2 | 10/2005 | Matsuoka et al. |
| 6,965,665 B2 | 11/2005 | Fan et al. |
| 6,983,204 B2 | 1/2006 | Knutson |
| 6,987,964 B2 | 1/2006 | Obradovich et al. |
| 6,989,765 B2 | 1/2006 | Gueziec |
| 6,999,873 B1 | 2/2006 | Krull et al. |
| 7,010,583 B1 | 3/2006 | Aizono et al. |
| 7,062,378 B2 | 6/2006 | Krull et al. |
| 7,069,143 B2 | 6/2006 | Peterson |
| 7,103,854 B2 | 9/2006 | Fuchs et al. |
| 7,161,497 B2 | 1/2007 | Gueziec |
| 7,209,828 B2 | 4/2007 | Katou |
| 7,221,287 B2 | 5/2007 | Gueziec |
| 7,243,134 B2 | 7/2007 | Bruner et al. |
| 7,343,242 B2 | 3/2008 | Breitenberger et al. |
| 7,356,392 B2 | 4/2008 | Hubbard et al. |
| 7,375,649 B2 | 5/2008 | Gueziec |
| 7,424,388 B2 | 9/2008 | Sato |
| 7,433,676 B2 | 10/2008 | Kobayashi et al. |
| 7,440,842 B1 | 10/2008 | Vorona |
| 7,486,201 B2 | 2/2009 | Kelly et al. |
| 7,508,321 B2 | 3/2009 | Gueziec |
| 7,557,730 B2 | 7/2009 | Gueziec |
| 7,558,674 B1 | 7/2009 | Neilley et al. |
| 7,603,138 B2 | 10/2009 | Zhang et al. |
| 7,610,145 B2 | 10/2009 | Kantarjiev et al. |
| 7,613,564 B2 | 11/2009 | Vorona |
| 7,634,352 B2 | 12/2009 | Soulchin et al. |
| 7,702,452 B2 | 4/2010 | Kantarjiev et al. |
| 7,746,343 B1 | 6/2010 | Charaniya et al. |
| 7,792,641 B2 | 9/2010 | Liu et al. |
| 7,792,642 B1 | 9/2010 | Neilley et al. |
| 7,835,858 B2 | 11/2010 | Smyth et al. |
| 7,847,708 B1 | 12/2010 | Jones et al. |
| 7,880,642 B2 | 2/2011 | Gueziec |
| 7,908,076 B2 | 3/2011 | Downs et al. |
| 7,912,627 B2 | 3/2011 | Downs et al. |
| 8,024,111 B1 | 9/2011 | Meadows et al. |
| 8,103,443 B2 | 1/2012 | Kantarjiev et al. |
| 8,229,658 B1 | 7/2012 | Dabell |
| 8,358,222 B2 | 1/2013 | Gueziec |
| 8,428,856 B2 | 4/2013 | Tischer |
| 8,531,312 B2 | 9/2013 | Gueziec |
| 8,537,033 B2 | 9/2013 | Gueziec |
| 8,564,455 B2 | 10/2013 | Gueziec |
| 8,618,954 B2 | 12/2013 | Free |
| 8,619,072 B2 | 12/2013 | Gueziec |
| 8,660,780 B2 | 2/2014 | Kantarjiev |
| 8,718,910 B2 | 5/2014 | Gueziec |
| 8,725,396 B2 | 5/2014 | Gueziec |
| 8,781,718 B2 | 7/2014 | Margulici |
| 8,786,464 B2 | 7/2014 | Gueziec |
| 8,825,356 B2 | 9/2014 | Vorona |
| 8,958,988 B2 | 2/2015 | Gueziec |
| 8,965,695 B2 | 2/2015 | Tzamaloukas |
| 8,972,171 B1 | 3/2015 | Barth |
| 8,982,116 B2 | 3/2015 | Gueziec |
| 9,002,636 B2 | 4/2015 | Udeshi et al. |
| 9,046,924 B2 | 6/2015 | Gueziec |
| 9,070,291 B2 | 6/2015 | Gueziec |
| 9,082,303 B2 | 7/2015 | Gueziec |
| 9,127,959 B2 | 9/2015 | Kantarjiev |
| 9,158,980 B1 | 10/2015 | Ferguson et al. |
| 9,293,039 B2 | 3/2016 | Margulici |
| 9,368,029 B2 | 6/2016 | Gueziec |
| 9,390,620 B2 | 7/2016 | Gueziec |
| 9,401,088 B2 | 7/2016 | Gueziec |
| 9,448,690 B2 | 9/2016 | Gueziec |
| 9,489,842 B2 | 11/2016 | Gueziec |
| 2001/0005809 A1 | 6/2001 | Ito |
| 2001/0014848 A1 | 8/2001 | Walgers et al. |
| 2001/0018628 A1 | 8/2001 | Jenkins et al. |
| 2001/0026276 A1 | 10/2001 | Sakamoto et al. |
| 2001/0033225 A1 | 10/2001 | Razavi et al. |
| 2001/0047242 A1 | 11/2001 | Ohta |
| 2001/0049424 A1 | 12/2001 | Petiniot et al. |
| 2002/0022923 A1 | 2/2002 | Hirabayashi et al. |
| 2002/0042819 A1 | 4/2002 | Reichert et al. |
| 2002/0077748 A1 | 6/2002 | Nakano |
| 2002/0152020 A1 | 10/2002 | Seibel |
| 2002/0177947 A1 | 11/2002 | Cayford |
| 2003/0009277 A1 | 1/2003 | Fan et al. |
| 2003/0046158 A1 | 3/2003 | Kratky |
| 2003/0055558 A1 | 3/2003 | Watanabe et al. |
| 2003/0109985 A1 | 6/2003 | Kotzin |
| 2003/0135304 A1 | 7/2003 | Sroub et al. |
| 2003/0151592 A1 | 8/2003 | Ritter |
| 2003/0182052 A1 | 9/2003 | DeLorme et al. |

(56) References Cited

U.S. PATENT DOCUMENTS

| | | |
|---|---|---|
| 2004/0034464 A1 | 2/2004 | Yoshikawa et al. |
| 2004/0046759 A1 | 3/2004 | Soulchin et al. |
| 2004/0049424 A1 | 3/2004 | Murray et al. |
| 2004/0080624 A1 | 4/2004 | Yuen |
| 2004/0107288 A1 | 6/2004 | Menninger et al. |
| 2004/0143385 A1 | 7/2004 | Smyth et al. |
| 2004/0166939 A1 | 8/2004 | Leifer et al. |
| 2004/0225437 A1 | 11/2004 | Endo et al. |
| 2004/0249568 A1 | 12/2004 | Endo et al. |
| 2005/0021225 A1 | 1/2005 | Kantarjiev et al. |
| 2005/0027436 A1 | 2/2005 | Yoshikawa et al. |
| 2005/0083325 A1 | 4/2005 | Cho |
| 2005/0099321 A1 | 5/2005 | Pearce |
| 2005/0143902 A1 | 6/2005 | Soulchin et al. |
| 2005/0154505 A1 | 7/2005 | Nakamura et al. |
| 2005/0212756 A1 | 9/2005 | Marvit et al. |
| 2005/0240340 A1 | 10/2005 | Ishikawa et al. |
| 2006/0074546 A1 | 4/2006 | DeKock et al. |
| 2006/0122846 A1 | 6/2006 | Burr et al. |
| 2006/0136846 A1 | 6/2006 | Im et al. |
| 2006/0143959 A1 | 7/2006 | Stehle et al. |
| 2006/0145892 A1 | 7/2006 | Gueziec |
| 2006/0158330 A1 | 7/2006 | Gueziec |
| 2006/0238521 A1 | 10/2006 | Westerman et al. |
| 2006/0238617 A1 | 10/2006 | Tamir |
| 2006/0284766 A1 | 12/2006 | Gruchala et al. |
| 2007/0009156 A1 | 1/2007 | O'Hara |
| 2007/0013551 A1 | 1/2007 | Gueziec |
| 2007/0038362 A1 | 2/2007 | Gueziec |
| 2007/0060384 A1 | 3/2007 | Dohta |
| 2007/0066394 A1 | 3/2007 | Ikeda et al. |
| 2007/0115252 A1 | 5/2007 | Burgmans |
| 2007/0142995 A1 | 6/2007 | Wottlermann |
| 2007/0197217 A1 | 8/2007 | Sutardja |
| 2007/0208494 A1 | 9/2007 | Chapman et al. |
| 2007/0208495 A1 | 9/2007 | Chapman et al. |
| 2007/0208496 A1 | 9/2007 | Downs et al. |
| 2007/0211026 A1 | 9/2007 | Ohta |
| 2007/0211027 A1 | 9/2007 | Ohta |
| 2007/0222750 A1 | 9/2007 | Ohta |
| 2007/0247291 A1 | 10/2007 | Masuda et al. |
| 2007/0265766 A1 | 11/2007 | Jung et al. |
| 2007/0290839 A1* | 12/2007 | Uyeki ............... G01C 21/3415 340/539.13 |
| 2008/0014908 A1 | 1/2008 | Vasant |
| 2008/0021632 A1 | 1/2008 | Amano |
| 2008/0071465 A1 | 3/2008 | Chapman et al. |
| 2008/0084385 A1 | 4/2008 | Ranta et al. |
| 2008/0096654 A1 | 4/2008 | Mondesir et al. |
| 2008/0133120 A1 | 6/2008 | Romanick |
| 2008/0133132 A1 | 6/2008 | Jung et al. |
| 2008/0248848 A1 | 10/2008 | Rippy et al. |
| 2008/0255754 A1 | 10/2008 | Pinto |
| 2008/0287189 A1 | 11/2008 | Rabin |
| 2008/0297488 A1 | 12/2008 | Operowsky et al. |
| 2009/0005965 A1 | 1/2009 | Forstall et al. |
| 2009/0061971 A1 | 3/2009 | Weitzner et al. |
| 2009/0066495 A1 | 3/2009 | Newhouse et al. |
| 2009/0082950 A1 | 3/2009 | Vorona |
| 2009/0096753 A1 | 4/2009 | Lim |
| 2009/0112465 A1 | 4/2009 | Weiss et al. |
| 2009/0118017 A1 | 5/2009 | Perlman et al. |
| 2009/0118996 A1 | 5/2009 | Kantarjiev et al. |
| 2009/0189979 A1 | 7/2009 | Smyth |
| 2009/0192702 A1 | 7/2009 | Bourne |
| 2009/0254272 A1 | 10/2009 | Hendrey |
| 2010/0036594 A1 | 2/2010 | Yamane |
| 2010/0045517 A1 | 2/2010 | Tucker |
| 2010/0079306 A1 | 4/2010 | Liu et al. |
| 2010/0094531 A1 | 4/2010 | MacLeod |
| 2010/0100307 A1 | 4/2010 | Kim |
| 2010/0145569 A1 | 6/2010 | Bourque et al. |
| 2010/0145608 A1 | 6/2010 | Kurtti et al. |
| 2010/0164753 A1 | 7/2010 | Free |
| 2010/0175006 A1 | 7/2010 | Li |
| 2010/0194632 A1 | 8/2010 | Raento et al. |
| 2010/0198453 A1 | 8/2010 | Dorogusker et al. |
| 2010/0225643 A1 | 9/2010 | Gueziec |
| 2010/0305839 A1 | 12/2010 | Wenzel |
| 2010/0312462 A1 | 12/2010 | Gueziec |
| 2010/0333045 A1 | 12/2010 | Gueziec |
| 2011/0029189 A1 | 2/2011 | Hyde et al. |
| 2011/0037619 A1 | 2/2011 | Ginsberg et al. |
| 2011/0106427 A1 | 5/2011 | Kim et al. |
| 2011/0161261 A1 | 6/2011 | Wu et al. |
| 2011/0304447 A1 | 12/2011 | Marumoto |
| 2012/0044066 A1 | 2/2012 | Mauderer et al. |
| 2012/0065871 A1 | 3/2012 | Deshpande et al. |
| 2012/0072096 A1 | 3/2012 | Chapman et al. |
| 2012/0123667 A1 | 5/2012 | Gueziec |
| 2012/0150422 A1 | 6/2012 | Kantarjiev et al. |
| 2012/0150425 A1 | 6/2012 | Chapman et al. |
| 2012/0158275 A1 | 6/2012 | Huang et al. |
| 2012/0226434 A1 | 9/2012 | Chiu |
| 2012/0290202 A1 | 11/2012 | Gueziec |
| 2012/0290204 A1 | 11/2012 | Gueziec |
| 2012/0296559 A1 | 11/2012 | Gueziec |
| 2013/0033385 A1 | 2/2013 | Gueziec |
| 2013/0204514 A1 | 8/2013 | Margulici |
| 2013/0207817 A1 | 8/2013 | Gueziec |
| 2013/0211701 A1 | 8/2013 | Baker et al. |
| 2013/0297175 A1 | 11/2013 | Davidson |
| 2013/0304347 A1 | 11/2013 | Davidson |
| 2013/0304349 A1 | 11/2013 | Davidson |
| 2014/0088871 A1 | 3/2014 | Gueziec |
| 2014/0091950 A1 | 4/2014 | Gueziec |
| 2014/0107923 A1 | 4/2014 | Gueziec |
| 2014/0129124 A1 | 5/2014 | Margulici |
| 2014/0129142 A1 | 5/2014 | Kantarjiev |
| 2014/0139520 A1 | 5/2014 | Gueziec |
| 2014/0200807 A1 | 7/2014 | Geisberger |
| 2014/0236464 A1 | 8/2014 | Gueziec |
| 2014/0249734 A1 | 9/2014 | Gueziec |
| 2014/0316688 A1 | 10/2014 | Margulici |
| 2014/0320315 A1 | 10/2014 | Gueziec |
| 2015/0081196 A1 | 3/2015 | Petty et al. |
| 2015/0141043 A1 | 5/2015 | Abramson et al. |
| 2015/0168174 A1 | 6/2015 | Abramson et al. |
| 2015/0168175 A1 | 6/2015 | Abramson et al. |
| 2015/0177018 A1 | 6/2015 | Gueziec |
| 2015/0248795 A1 | 9/2015 | Davidson |
| 2015/0261308 A1 | 9/2015 | Gueziec |
| 2015/0268055 A1 | 9/2015 | Gueziec |
| 2015/0268056 A1 | 9/2015 | Gueziec |
| 2015/0325123 A1 | 11/2015 | Gueziec |
| 2016/0047667 A1 | 2/2016 | Kantarjiev |
| 2016/0267788 A1 | 9/2016 | Margulici |
| 2016/0302047 A1 | 10/2016 | Gueziec |
| 2016/0321918 A1 | 11/2016 | Gueziec |
| 2016/0335893 A1 | 11/2016 | Gueziec |

FOREIGN PATENT DOCUMENTS

| | | |
|---|---|---|
| CO | 6710924 | 7/2013 |
| DE | 19856704 | 6/2001 |
| EP | 0 680 648 | 11/1995 |
| EP | 0 749 103 | 12/1996 |
| EP | 0 987 665 | 3/2000 |
| EP | 1 006 367 | 6/2000 |
| EP | 1 235 195 | 8/2002 |
| EP | 2 178 061 | 4/2010 |
| EP | 2 635 989 | 9/2011 |
| EP | 2 616 910 | 7/2013 |
| EP | 2 638 493 | 9/2013 |
| EP | 2 710 571 | 3/2014 |
| EP | 2 820 631 | 1/2015 |
| GB | 2 400 293 | 10/2004 |
| JP | 05-313578 | 11/1993 |
| JP | 08-77485 | 3/1996 |
| JP | 10-261188 | 9/1998 |
| JP | 10-281782 | 10/1998 |
| JP | 10-293533 | 11/1998 |
| JP | 2000-055675 | 2/2000 |
| JP | 2000-113387 | 4/2000 |

(56) References Cited

FOREIGN PATENT DOCUMENTS

| | | |
|---|---|---|
| JP | 2001-330451 | 11/2001 |
| WO | WO 1996/036929 | 11/1996 |
| WO | WO 98/23018 | 5/1998 |
| WO | WO 00/50917 | 8/2000 |
| WO | WO 01/88480 | 11/2001 |
| WO | WO 02/77921 | 10/2002 |
| WO | WO 03/014671 | 2/2003 |
| WO | WO 2005/013063 | 2/2005 |
| WO | WO 2005/076031 | 8/2005 |
| WO | WO 2010/073053 | 7/2010 |
| WO | WO 2012/024694 | 2/2012 |
| WO | WO 2012/037287 | 3/2012 |
| WO | WO-2012037287 A1 | 3/2012 |
| WO | WO 2012/065188 | 5/2012 |
| WO | WO-2012065188 A2 | 5/2012 |
| WO | WO 2012/159083 | 11/2012 |
| WO | WO-2012159083 A2 | 11/2012 |
| WO | WO-2012159803 A1 | 11/2012 |
| WO | WO 2013/113029 | 8/2013 |

OTHER PUBLICATIONS

Acura Debuts AcuraLink™ Satellite-Linked Communication System with Industry's First Standard Real Time Traffic Feature at New York International Auto Show, 2004, 4 pages.
Adib Kanafani, "Towards a Technology Assessment of Highway Navigation and Route Guidance," Program on Advanced Technology for the Highway, Institute of Transportation Studies, University of California, Berkeley, Dec. 1987, PATH Working Paper UCB-ITS-PWP-87-6.
Answer, Affirmative Defenses, and Counterclaims by Defendant Westwood One, Inc., to Plaintiff Triangle Software, LLC's Complaint for Patent Infringement, Mar. 11, 2011.
Answer and Counterclaims of TomTom, Inc. to Plaintiff Triangle Software, LLC's Complaint for Patent Infringement, May 16, 2011.
Amended Answer and Counterclaims of TomTom, Inc. to Plaintiff Triangle Software, LLC's Complaint for Patent Infringement, Mar. 16, 2011.
Attachment A of Garmin's Preliminary Invalidity Contentions and Certificate of Service filed May 16, 2011 in *Triangle Software, LLC. V. Garmin International, Inc. et al.*, Case No. 1: 10-cv-1457-CMH-TCB in the United States District Court for the Eastern District of Virginia, Alexandria Division, 6 pages.
Attachment B of Garmin's Preliminary Invalidity Contentions and Certificate of Service filed May 16, 2011 in *Triangle Software, LLC. V. Garmin International, Inc. et al.*, Case No. 1: 10-cv-1457-CMH-TCB in the United States District Court for the Eastern District of Virginia, Alexandria Division, 618 pages.
Audi-V150 Manual, Oct. 2001, 152 pages, Japan.
Balke, K.N., "Advanced Technologies for Communicating with Motorists: A Synthesis of Human Factors and Traffic Management Issues," Report No. FHWA/TX-92/1232-8, May 1992, Texas Department Transportation, Austin, TX, USA, 62 pages.
Barnaby J. Feder, "Talking Deals; Big Partners in Technology," Technology, The New York Times, Sep. 3, 1987.
Birdview Navigation System by Nissan Motor Corp, 240 Landmarks of Japanese Automotive Technology, 1995, 2 pages, Society of Automotive Engineers of Japan, Inc., Japan.
Blumentritt, K. et al., "Travel System Architecture Evaluation," Publication No. FHWA-RD-96-141, Jul. 1995, 504 pages, U.S. Department of Transportation, McLean, VA, USA.
Brooks, et al., "Turn-by-Turn Displays versus Electronic Maps: An On-the-Road Comparison of Driver Glance Behavior," Technical Report, The University of Michigan, Transportation Research Institute (UMTRI), Jan. 1999.
Burgett, A.L., "Safety Evaluation of TravTek," Vehicle Navigation & Information Systems Conference Proceedings (VNIS'91), P-253, Part 1, Oct. 1991, pp. 819-825, Soc. of Automotive Engineers, Inc., Warrendale, PA, USA.

Campbell, J.L. "Development of Human Factors Design Guidelines for Advanced Traveler Information Systems (ATIS)", Proceedings Vehicle Navigation and Information Systems Conference, 1995, pp, 161-164, IEEE, New York, NY, USA.
Campbell, J.L. "Development of Human Factors Design Guidelines for Advanced Traveler Information Systems (ATIS) and Commercial Vehicle Operations (CVO)", Publication No. FHWA-RD-98-057, Report Date Sep. 1998, 294, pages, U.S. Department of Transportation, McLean, VA 22010-2296.
Carin Navigation System Manual and Service Manual for Model Carin 22SY520, 75 pages, Philips Car Systems, The Netherlands, [date unknown].
Cathey, F.W. et al., "A Prescription for Transit Arrival/Department Prediction Using Automatic Vehicle Location Data," Transportation Research Part C 11, 2003, pp. 241-264, Pergamon Press Ltd., Elsevier Ltd., U.K.
Chien, S.I. et al., "Predicting Travel Times for the South Jersey Real-Time Motorist Information System," Transportation Research Record 1855, Paper No. 03-2750, Revised Oct. 2001, pp. 32-40.
Chira-Chavala, T. et al., "Feasibility Study of Advanced Technology HOV Systems," vol. 3: Benefit Implications of Alternative Policies for Including HOV lanes in Route Guidance Networks, Dec. 1992, 84 ages, UCB-ITS-PRR-92-5 PATH Research Report, Inst. of Transportation Studies, Univ. of Calif., Berkeley, USA.
Clark, E.L., Development of Human Factors Guidelines for Advanced Traveler Information Systems (ATIS) and Commercial Vehicle Operations (CVO): Comparable Systems Analysis, Dec. 1996, 199 pages.
Coifman, Benjamin; "Vehicle Reidentification and Travel Time Measurement on Congested Freeeways", Journal of Transportation Engineering, Oct. 1, 1999; pp. 475-483.
Dancer, F. et al., "Vehicle Navigation Systems: Is America Ready?," Navigation and Intelligent Transportation System, Automotive Electronics Series, Society of Automotive Engineers, 1998, pp. Cover page, Table of Contents pp. 3-8.
Davies, P. et al., "Assessment of Advanced Technologies for Relieving Urban Traffic Congestion" National Cooperative Highway Research Program Report 340, Dec. 1991, 106 pages.
De Cambray, B. "Three-Dimensional (3D) Modeling in a Geographical Database," Auto-Carto'11, Eleventh International Conference on Computer Assisted Cartography, Oct. 30, 1993-Nov. 1, 1993, pp. 338-347, Minneapolis, USA.
Declaration Under 37 C.F.R. 1.131 and Source Code from U.S. Appl. No. 10/897,550, filed Oct. 27, 2008.
Dillenburg, J.F. et al., "The Intelligent Travel Assistant," IEEE 5th International Conference on Intelligent Transportation Systems, Sep. 3-6, 2002, pp. 691-696, Singapore.
Dingus, T.A. et al., "Human Factors Engineering the TravTek Driver Interface," Vehicle Navigation & Information System Conference Proceedings (VNIS'91), P-253, Part 2, Oct. 1991, pp. 749-755, Soc. of Automotive Engineers, Inc., Warrendale, PA, USA.
Endo, et al., "Development and Evaluation of a Car Navigation System Providing a Birds Eye View Map Display," Navigation and Intelligent Transportation Systems, Automotive Electronics Series, Society of Automotive Engineers, 1998, pp. Cover page, Table of Contents, pp. 19-22.
Eppinger, A. et al., "Dynamic Route Guidance—Status and Trends," Convergence 2000 International Congress on Transportation Electronics, Oct. 16-18, 1999, 7 pages, held in Detroit, MI, SAE International Paper Series, Warrendale, PA, USA.
Expert Report of Dr. Michael Goodchild Concerning the Validity of U.S. Pat. No. 5,938,720 dated Jun. 16, 2011 in *Triangle Software, LLC v. Garmin International Inc. et al.*, in the United States District Court for the Eastern District of Virginia, Alexandria Division, Case No. 1:10-cv-1457-CMH-TCB, 16 pages.
Fawcett, J., "Adaptive Routing for Road Traffic," IEEE Computer Graphics and Applications, May/Jun. 2000, pp. 46-53, IEEE, New York, NY, USA.
Fleischman, R.N., "Research and Evaluation Plans for the TravTek IVHS Operational Field Test, "Vehicle Navigation & Information Systems Conference Proceedings (VNIS'91), P-253, Part 2, Oct. 1991, pp. 827-837, Soc. of Automotive Engineers, Inc., Warrendale, PA, USA.

(56) References Cited

OTHER PUBLICATIONS

Garmin International, Inc.'s Answer and Counterclaims to Triangle Software, LLC's Complaint, Feb. 24, 2011.
Garmin International, Inc.'s Amended Answer and Counterclaims to Triangle Software, LLC's Complaint, Mar. 16, 2011.
Garmin International, Inc. and Garmin USA, Inc.'s Answer and Counterclaim to Triangle Software, LLC's Supplemental Complaints filed Jun. 17, 2011 in *Triangle Software, LLC v. Garmin International Inc. et al.*, in the United States District Court for the Eastern District of Virginia, Alexandria Division, Case No. 1:10-cv-1457-CMH-TCB, 36 pages.
Garmin's Preliminary Invalidity Contentions and Certificate of Service filed May 16, 2011 in *Triangle Software, LLC. V. Garmin International, Inc. et al.*, Case No. 1: 10-cv-1457-CMH-TCB in the United States District Court for the Eastern District of Virginia, Alexandria Division, 46 pages.
Goldberg et al., "Computing the Shortest Path: A* Search Meets Graph Theory," Proc. of the 16th Annual ACM-SIAM Sym. on Discrete Algorithms, Jan. 23-25, 2005. Vancouver, BC.
Goldberg et al., "Computing the Shortest Path: A* Search Meets Graph Theory," Microsoft Research, Technical Report MSR-TR-2004 Mar. 24, 2003.
Golisch, F., Navigation and Telematics in Japan, International Symposium on Car Navigation Systems, May 21, 1997, 20 pages, held in Barcelona, Spain.
GM Exhibits Prototype of TravTek Test Vehicle, Inside IVHS, Oct. 28, 1991, V. 1, No. 21, 2 pages.
Gueziec, Andre, "3D Traffic Visualization in Real Time," ACM Siggraph Technical Sketches, Conference Abstracts and Applications, p. 144, Los Angeles, CA, Aug. 2001.
Gueziec, A., "Architecture of a System for Producing Animated Traffic Reports," Mar. 30, 2011, 42 pages.
Handley, S. et al., "Learning to Predict the Duration of an Automobile Trip," Proceedings of the Fourth International Conference on Knowledge Discovery and Data Mining, 1998, 5 pages, AAAI Press, New York, NY, USA.
Hankey, et al., "In-Vehicle Information Systems Behavioral Model and Design Support: Final Report," Feb. 16, 2000, Publication No. 00-135, Research, Development, and Technology, Turner-Fairbank Highway Research Center, McLean, Virginia.
Hirata et al., "The Development of a New Multi-AV System Incorporating an On-Board Navigation Function," International Congress and Exposition, Mar. 1-5, 1993, pp. 1-12, held in Detroit, MI, SAE International, Warrendale, PA, USA.
Hoffmann, G. et al., Travel Times as a Basic Part of the LISB Guidance Strategy, Third International Conference on Road Traffic Control, May 1-3, 1990, pp. 6-10, London, U.K.
Hoffmann, T., "2005 Acura RL Prototype Preview," Auto123.com, 4 pages.
Hu, Z. et al., "Real-time Data Fusion on Tracking Camera Pose for Direct Visual Guidance," IEEE Vehicles Symposium, Jun. 14-17, 2004, pp. 842-847, held in Parma, Italy.
Huang, Tsan-Huang, Chen, Wu-Cheng; "Experimental Analysis and Modeling of Route Choice with the Revealed and Stated Preference Data" Journal of the Eastern Asia Society for Transportation Studies, vol. 3, No. 6, Sep. 1999—Traffic Flow and Assignment.
Hulse, M.C. et al., "Development of Human Factors Guidelines for Advanced Traveler Information Systems and Commercial Vehicle Operations: Identification of the Strengths and Weaknesses of Alternative Information Display Formats," Publication No. FHWA-RD-96-142, Oct. 16, 1998, 187 pages, Office of Safety and Traffic Operation R&D, Federal Highway Administration, USA.
Initial Expert Report of Roy Summer dated Jun. 16, 2011 in *Triangle Software, LLC v. Garmin International Inc. et al.*, in the United States District Court for the Eastern District of Virginia, Alexandria Division, Case No. 1:10-cv-1457-CMH-TCB, 289 pages.
Initial Expert Report of William R. Michalson, Ph.D. dated Jun. 17, 2011 in *Triangle Software, LLC v. Garmin International Inc. et al.*, in the United States District Court for the Eastern District of Virginia, Alexandria Division, Case No. 1:10-cv-1457-CMH-TCB, 198 pages.
Inman, V.W., et al., "TravTek Global Evaluation and Executive Summary," Publication No. FHWA-RD-96-031, Mar. 1996, 104 pages, U.S. Department of Transportation, McLean, VA, USA.
Inman, V.W., et al., "TravTek Evaluation Rental and Local User Study," Publication No. FHWA-RD-96-028, Mar. 1996, 110 pages, U.S. Department of Transportation, McLean, VA, USA.
Jiang, G., "Travel-Time Prediction for Urban Arterial Road: A Case on China," Proceedings Intelligent Transportation Systems, Oct. 12-15, 2003, pp. 255-260, IEEE, New York, NY, USA.
Karabassi, A. et al., "Vehicle Route Prediction and Time and Arrival Estimation Techniques for Improved Transportation System Management," in Proceedings of the Intelligent Vehicles Symposium, 2003, pp. 511-516, IEEE, New York, NY, USA.
Koller, D. et al., "VIRTUAL GIS: A Real-Time 3D Geographic Information System," Proceedings of the 6th IEEE Visualization Conference (Visualization 95) 1995, pp. 94-100, IEEE, New York, NY, USA.
Kopitz et al., Table of Contents, Chapter 6, Traffic Information Services, and Chapter 7, Intelligent Transport Systems and RDS-TMC in RDS: The Radio Data System, 1992, Cover page-XV, pp. 107-167, Back Cover page, Artech House Publishers, Boston, USA and London, Great Britain.
Krage, M.K., "The TravTek Driver Information System," Vehicle Navigation & Information Systems Conference Proceedings (VNIS'91), P-253, Part 1, Oct. 1991, pp. 739-748, Soc. of Automotive Engineers, Inc., Warrendale, PA, USA.
Ladner, R. et al., "3D Mapping of Interactive Synthetic Environment," Computing Practices, Mar. 2000, pp. 33-39, IEEE, New York, NY, USA.
Levinson, D., "Assessing the Benefits and Costs of Intelligent Transportation Systems: The Value of Advanced Traveler Information System," Publication UCB-ITS-PRR-99-20, California Path Program, Jul. 1999, Institute of Transportation Studies, University of California, Berkeley, CA, USA.
Lowenau, J., "Final Map Actualisation Requirements," Version 1.1, ActMAP Consortium, Sep. 30, 2004, 111 pages.
Meridian Series of GPS Receivers User Manual, Magellan, 2002, 106 pages, Thales Navigation, Inc., San Dimas, CA, USA.
Ness, M., "A Prototype Low Cost In-Vehicle Navigation System," IEEE-IEE Vehicle Navigation & Information Systems Conference (VNIS), 1993, pp. 56-59, New York, NY, USA.
N'Fit Xanavi, unknown date, 94 pages, Japana, Date of Download: May 17, 2013.
Nintendo Wii Operations Manual Systems Setup. 2009.
Nissan Automobile Navigation System User Manual, [date unknown], 163 pages. Date of Download: May 17, 2013.
Noonan, J., "Intelligent Transportation Systems Field Operational Test Cross-Cutting Study Advanced Traveler Information Systems," Sep. 1998, 27 pages, U.S. Department of Transportation, McLean, VA, USA.
Odagaki et al., Automobile Navigation System with Multi-Source Guide Information, International Congress & Exposition, Feb. 24-28, 1992, pp. 97-105. SAE International, Warrendale, PA, USA.
Panasonic Portable Navigation System User Manual for Products KX-GT30, KX-GT30X, and KX-GT3OZ, Cover page, pp. 1-5, 132-147, End pages, Matsushita Denki Sangyo K.K., Fukuoka City, Japan [Date Unknown].
Preliminary Invalidity Contentions of Defendant TomTom, Inc., Certificate of Service and Exhibit A filed May 16, 2011 in *Triangle Software, LLC. V. Garmin International, Inc. et al.*, Case No. 1: 10-cv-1457-CMH-TCB in the United States District Court for the Eastern District of Virginia, Alexandria Division, 354 pages
Raper, J.F., "Three-Dimensional GIS," in Geographical Information Systems: Principles and Applications, 1991, vol. 1, Chapter 20, 21 pages.
"Reference Manual for the Magellan RoadMate 500/700." 2003, 65 pages, Thales Navigation, Inc., San Dimas, CA, USA.
Riiett, L.R., "Simulating the TravTek Route Guidance Logic Using the Integration Traffic Model," Vehicle Navigation & Information

(56) References Cited

OTHER PUBLICATIONS

System, P-253, Part 2, Oct. 1991, pp. 775-787, Soc. of Automotive Engineers, Inc., Warrendale, PA, USA.
Rillings, J.H., "Advanced Driver Information Systems," IEEE Transactions on Vehicular Technology, Feb. 1991, vol. 40, No. 1, pp. 31-40, IEEE, New York, NY, USA.
Rillings, J.H., "TravTek," Vehicle Navigation & Information System Conference Proceedings (VNIS'91), P-253, Part 2, Oct. 1991, pp. 729-737, Soc. of Automotive Engineers, Inc., Warrendale, PA, USA.
Rockwell, Mark, "Telematics Speed Zone Ahead," Wireless Week, Jun. 15, 2004, Reed Business Information, http://www.wirelessweek.com.
Rupert, R.L., "The TravTek Traffic Management Center and Traffic Information Network," Vehicle Navigation & Information System Conference Proceedings (VNIS'91), P-253, Part 1, Oct. 1991, pp. 757-761, Soc. of Automotive Engineers, Inc., Warrendale, PA, USA.
Schofer, J.L., "Behavioral Issues in the Design and Evaluation of Advanced Traveler Information Systems," Transportation Research Part C 1, 1993, pp. 107-117, Pergamon Press Ltd., Elsevier Science Ltd.
Schulz, W., "Traffic Management Improvement by Integrating Modem Communication Systems," IEEE Communications Magazine, Oct. 1996, pp. 56-60, New York, NY, USA.
Shepard, I.D.H., "Information Integration and GIS," in Geographical Information Systems: Principles and Applications, 1991, vol. 1, pp. Cover page, 337-360, end page.
Sirius Satellite Radio: Traffic Development Kit Start Up Guide, Sep. 27, 2005, Version 00.00.01, NY, New York, 14 pages.
Slothhower, D., "Sketches & Applications," SIGGRAPH 2001, pp. 138-144, Stanford University.
Sumner, R., "Data Fusion in Pathfinder and TravTek," Part 1, Vehicle Navigation & Information Systems Conference Proceedings (VNIS'91), Oct. 1991, Cover & Title page, pp. 71-75.
Supplemental Expert Report of William R. Michalson, Ph.D. Regarding Invalidity of the Patents-in-Suit dated Jul. 5, 2011 in *Triangle Software, LLC* v. *Garmin International Inc. et al.*, in the United States District Court for the Eastern District of Virginia, Alexandria Division, Case No. 1:10-cv-1457-CMH-TCB, 23 pages.
Tamuara et al., "Toward Realization of VICS—Vehicle Information and Communications System," IEEE-IEE Vehicle Navigation & Information Systems Conference (VNIS'93), 1993, pp. 72-77, held in Ottawa, Canada.
Taylor, K.B., "TravTek-Information and Services Center," Vehicle Navigation & Information System Conference Proceedings (VNIS'91), P-253, Part 2, Oct. 1991, pp. 763-774, Soc. of Automotive Engineers, Inc., Warrendale, PA, USA.
Texas Transportation Institute, "2002 Urban Mobility Study: 220 Mobility Issues and Measures: The Effects of Incidents—Crashes and Vehicle Breakdowns" (2002).
"The Challenge of VICS: The Dialog Between the Car and Road has Begun," Oct. 1, 1996, pp. 19-63, The Road Traffic Information Communication System Centre (VICS Centre), Tokyo, Japan.
Thompson, S.M., "Exploiting Telecommunications to Delivery Real Time Transport Information," Road Transport Information and Control, Conf. Publication No. 454, Apr. 21-23, 1998, pp. 59-63, IEE, U.K.
Tonjes, R., "3D Reconstruction of Objects from Ariel Images Using a GIS," presented at ISPRS Workshops on "Theoretical and Practical Aspects of Surface Reconstructions and 3-D Object Extraction" Sep. 9-11, 1997, 8 pages, held in Haifa, Israel.
"TRAVTEK Information and Services Center Policy/Procedures Manual," Feb. 1992, 133 pages, U.S. Department of Transportation, McLean, VA, USA.
Truett, R., "Car Navigation System May Live on After Test," The Orlando Sentinel, Feb. 17, 1993, p. 3 pages.
U.S. Dept. of Transportation, Closing the Data Gap: Guidelines for Quality Advanced Traveler Information System (ATIS) Data, Version 1.0, Sep. 2000, 41 pages.
User Guide of Tom Tom ONE; 2006.
Vollmer, R., "Navigation Systems—Intelligent Co-Drivers with Knowledge of Road and Tourist Information," Navigation and Intelligent Transportation Systems, Automotive Electronics Series, Society of Automotive Engineers, 1998, pp. Cover page, Table of Contents, pp. 9-17.
Volkswagen Group of America, Inc.'s Answer and Counterclaim, Feb. 24, 2011.
Watanabe, M. et al., "Development and Evaluation of a Car Navigation System Providing a Bird's-Eye View Map Display," Technical Paper No. 961007, Feb. 1, 1996, pp. 11-18, SAE International.
Wischhof, L. et al., "SOTIS—A Self-Organizing Traffic Information System," Proceedings of the 57th IEEE Vehicular Technology Conference (VTC-03), 2003, pp. 2442-2446, New York, NY, USA.
WSI, "TrueView Interactive Training Manual, Showfx Student Guide," Print Date: Sep. 2004, Document Version: 4.3x. Link: http://apollo.lsc.vsc.edu/intranet/WSI_Showfx/training/970-TVSK-SG-43.pdf.
XM Radio Introduces Satellite Update Service for Vehicle Navigation, Apr. 8, 2004, 2 pages.
Yang, Qi; "A Simulation Laboratory for Evaluation of Dynamic Traffic Management Systems", Massachusetts Institute of Technology, Jun. 1997.
Yim et al., TravInfo. Field Operational Test Evaluation "Evaluation of TravInfo Field Operation Test" Apr. 25, 2000.
Yim et al., "TravInfo Field Operational Test Evaluation: Information Service Providers Customer Survey", May 1, 2000.
Yokouchi, K., "Car-Navigation Systems," Mitsubishi Electr. Adv. Technical Reports, 2000, vol. 91, pp. 10-14, Japan.
You, J. et al., "Development and Evaluation of a Hybrid Travel Time Forecasting Model," Transportation Research Parc C 9, 2000, pp. 231-256, Pergamon Press Ltd., Elsevier Science Ltd., U.K.
Zhao, Y., "Vehicle Location and Navigation Systems," 1997, 370 pages, Arthech House, Inc., Norwood, MA, USA.
Zhu, C. et al. "3D Terrain Visualization for Web GIS," Center for Advance Media Technology, Nanyang Technological University, Singapore, 2003, 8 pages.
PCT Application No. PCT/US2004/23884, Search Report and Written Opinion dated Jun. 17, 2005.
PCT Application No. PCT/US2011/48680, Search Report and Written Opinion dated Feb. 7, 2012.
PCT Application No. PCT/US2011/51647, Search Report and Written Opinion dated Feb. 2, 2012.
PCT Application No. PCT/US2011/60663, Search Report and Written Opinion dated May 31, 2012.
PCT Application No. PCT/US2012/38702, Search Report and Written Opinion dated Aug. 24, 2012.
PCT Application No. PCT/US2013/23505, Search Report and Written Opinion dated May 10, 2013.
Canada Patent Application No. 2,688,129 Office Action dated Jan. 18, 2016.
EP Patent Application No. 12785688.8 Extended European Search Report dated Aug. 12, 2015.
EP Patent Application No. 1740931.4 Extended European Search Report dated Apr. 19, 2016.
U.S. Appl. No. 12/398,120, Final Office Action dated Mar. 26, 2013.
U.S. Appl. No. 12/398,120, Office Action dated Nov. 14, 2012.
U.S. Appl. No. 12/398,120, Final Office Action dated Apr. 12, 2012.
U.S. Appl. No. 12/398,120, Office Action dated Nov. 15, 2011.
U.S. Appl. No. 14/100,985, Office Action dated Oct. 1, 2015.
U.S. Appl. No. 14/100,985, Final Office Action dated Mar. 25, 2015.
U.S. Appl. No. 14/100,985, Office Action dated Sep. 23, 2014.
U.S. Appl. No. 10/897,550, Office Action dated Jun. 12, 2009.
U.S. Appl. No. 10/897,550, Office Action dated Jan. 21, 2009.
U.S. Appl. No. 10/897,550, Office Action dated Aug. 1, 2008.
U.S. Appl. No. 10/897,550, Office Action dated Oct. 3, 2007.
U.S. Appl. No. 12/283,748, Office Action dated Aug. 20, 2009.
U.S. Appl. No. 12/283,748, Office Action dated Mar. 11, 2009.
U.S. Appl. No. 12/763,199, Final Office Action dated Nov. 1, 2010.
U.S. Appl. No. 12/763,199, Office Action dated Aug. 5, 2010.
U.S. Appl. No. 13/316,250, Final Office Action dated Jun. 24, 2013.
U.S. Appl. No. 13/316,250, Office Action dated Jan. 18, 2013.
U.S. Appl. No. 13/296,108, Final Office Action dated Oct. 25, 2013.

(56) References Cited

OTHER PUBLICATIONS

U.S. Appl. No. 13/296,108, Office Action dated May. 9, 2013.
U.S. Appl. No. 14/265,290, Office Action dated May 31, 2016.
U.S. Appl. No. 14/265,290, Final Office Action dated Jan. 29, 2016.
U.S. Appl. No. 14/265,290, Office Action dated Jul. 23, 2015.
U.S. Appl. No. 10/379,967, Final Office Action dated May 11, 2005.
U.S. Appl. No. 10/379,967, Office Action dated Sep. 20, 2004.
U.S. Appl. No. 11/509,954, Office Action dated Nov. 23, 2007.
U.S. Appl. No. 11/751,628, Office Action dated Jan. 29, 2009.
U.S. Appl. No. 12/967,045, Final Office Action dated Jun. 27, 2012.
U.S. Appl. No. 12/967,045, Office Action dated Jul. 18, 2011.
U.S. Appl. No. 13/561,269, Office Action dated Dec. 13, 2012.
U.S. Appl. No. 13/561,327, Office Action dated Oct. 26, 2012.
U.S. Appl. No. 13/747,454, Office Action dated Jun. 17, 2013.
U.S. Appl. No. 14/327,468, Final Office Action dated Aug. 4, 2015.
U.S. Appl. No. 14/327,468, Office Action dated Mar. 12, 2015.
U.S. Appl. No. 14/624,498, Office Action dated Feb. 18, 2016.
U.S. Appl. No. 15/181,221 Office Action dated Aug. 11, 1926.
U.S. Appl. No. 13/475,502, Final Office Action dated Sep. 10, 2013.
U.S. Appl. No. 13/475,502, Office Action dated Apr. 22, 2013.
U.S. Appl. No. 14/275,702, Office Action dated Nov. 30, 2015.
U.S. Appl. No. 13/752,351, Office Action dated Jul. 22, 2013.
U.S. Appl. No. 14/323,352, Final Office Action dated Apr. 3, 2015.
U.S. Appl. No. 14/323,352, Office Action dated Nov. 26, 2014.
U.S. Appl. No. 15/077,880, Office Action dated Jul. 21, 2016.
U.S. Appl. No. 14/058,195, Final Office Action dated Mar. 1, 2016.
U.S. Appl. No. 14/058,195, Office Action dated Aug. 4, 2015.
U.S. Appl. No. 14/058,195, Final Office Action dated Apr. 8, 2015.
U.S. Appl. No. 14/058,195, Office Action dated Nov. 12, 2014.
U.S. Appl. No. 12/860,700, Final Office Action dated Jul. 22, 2014.
U.S. Appl. No. 12/860,700, Office Action dated Apr. 3, 2014.
U.S. Appl. No. 12/860,700, Final Office Action dated Jun. 26, 2013.
U.S. Appl. No. 12/860,700, Office Action dated Feb. 26, 2013..
U.S. Appl. No. 14/637,357, Office Action dated Aug. 23, 2016.
U.S. Appl. No. 12/881,690, Office Action dated Sep. 3, 2014.
U.S. Appl. No. 12/881,690, Final Office Action dated May 21, 2014.
U.S. Appl. No. 12/881,690, Office Action dated Jan. 9, 2014.
U.S. Appl. No. 12/881,690, Final Office Action dated Aug. 9, 2013.
U.S. Appl. No. 12/881,690, Office Action dated Apr. 22, 2013.
U.S. Appl. No. 14/726,858 Final Office Action dated Sep. 8, 2016.
U.S. Appl. No. 14/726,858 Office Action dated Feb. 22, 2016.
U.S. Appl. No. 15/218,619, Andre Gueziec, Method for Predicting a Travel Time for a Traffic Route, filed Jul. 25, 2016.
U.S. Appl. No. 15/181,221, Andre Gueziec, GPS Generated Traffic Information, filed Jun. 13, 2016.
U.S. Appl. No. 15/207,377, Andre Gueziec, System for Providing Traffic Data and Driving Efficiency Data, filed Jul. 11, 2016.
U.S. Appl. No. 14/265,290, Final Office Action dated Oct. 19, 2016.
"12398120_ProposedExaminersAmendment", (Jul. 2, 2013), 7 pgs.
"Answer and Counterclaims of TomTom", Inc. To Plaintiff Triangle Software, LLC's Complaint for Patent Infringement, (May 16, 2011), 42 pgs.
"U.S. Appl. No. 12/398,120, Notice of Allowance dated Jul. 10, 2013", 17 pgs.
"U.S. Appl. No. 12/398,120, Response filed Feb. 15, 2012 to Non Final Office Action dated Nov. 15, 2011", 12 pgs.
"U.S. Appl. No. 12/398,120, Response filed Mar. 14, 2013 to Non Final Office Action dated Nov. 14, 2012", 10 pgs.
"U.S. Appl. No. 12/398,120, Response filed Jun. 18, 2012 to Final Office Action dated Apr. 12, 2012", 11 pgs.
"U.S. Appl. No. 12/398,120, Response filed Jun. 26, 2013 to Final Office Action dated Mar. 26, 2013", 10 pgs.
"U.S. Appl. No. 12/860,700, 312 Amendment filed Feb. 11, 2015", 8 pgs.
"U.S. Appl. No. 12/860,700, Corrected Notice of Allowance dated Jan. 23, 2015", 4 pgs.
"U.S. Appl. No. 12/860,700, Examiner Interview Summary dated Sep. 29, 2014", 3 pgs.
"U.S. Appl. No. 12/860,700, Notice of Allowance dated Oct. 23, 2014", 16 pgs.
"U.S. Appl. No. 12/860,700, Notice of Allowance dated Nov. 24, 2014", 2 pgs.
"U.S. Appl. No. 12/860,700, Response filed May 28, 2013 to Non Final Office Action dated Feb. 26, 2013", 8 pgs.
"U.S. Appl. No. 12/860,700, Response filed Jul. 3, 2014 to Non Final Office Action dated Apr. 3, 2014", 12 pgs.
"U.S. Appl. No. 12/860,700, Response filed Sep. 22, 2014 to Final Office Action dated Jul. 22, 2014", 11 pgs.
"U.S. Appl. No. 12/860,700, Response filed Oct. 15, 2013 to Final Office Action dated Jun. 26, 2013", 9 pgs.
"U.S. Appl. No. 14/100,985, Advisory Action dated Jun. 26, 2015", 4 pgs.
"U.S. Appl. No. 14/100,985, Corrected Notice of Allowability dated May 31, 2016", 2 pgs.
"U.S. Appl. No. 14/100,985, Corrected Notice of Allowability dated Aug. 17, 2016", 2 pgs.
"U.S. Appl. No. 14/100,985, Notice of Allowance dated May 20, 2016", 6 pgs.
"U.S. Appl. No. 14/100,985, Response filed Mar. 1, 2016 to Non Final Office Action dated Oct. 1, 2015", 10 pgs.
"U.S. Appl. No. 14/100,985, Response filed Jun. 1, 2015 to Final Office Action dated Mar. 25, 2015", 9 pgs.
"U.S. Appl. No. 14/100,985, Response filed Aug. 20, 2015 to Advisory Action dated Jun. 26, 2015", 10 pgs.
"U.S. Appl. No. 14/100,985, Response filed Dec. 23, 2014 to Non Final Office Action dated Sep. 23, 2014", 13 pgs.
"U.S. Appl. No. 14/637,357, Final Office Action dated Mar. 3, 2017", 38 pgs.
"U.S. Appl. No. 14/637,357, Response filed Dec. 22, 2016 to Non Final Office Action dated Aug. 23, 2016", 8 pgs.
"U.S. Appl. No. 14/726,858, Notice of Allowance dated Jan. 25, 2017", 9 pgs.
"U.S. Appl. No. 14/726,858, Response filed Jul. 22, 2016 to Non Final Office Action dated Feb. 22, 2016", 11 pgs.
"U.S. Appl. No. 14/726,858, Response filed Dec. 8, 2016 to Final Office Action dated Sep. 8, 2016", 13 pgs.
"Canadian Application Serial No. 2,688,129, Response filed Jul. 15, 2016 to Office Action dated Jan. 18, 2016", 15 pgs.
"Canadian Application Serial No. 2,688,129, Voluntary Amendment filed Mar. 11, 2015", 13 pgs.
"Canadian Application Serial No. 2,811,517, Examiner's Rule 30(2) Requisition dated Jun. 19, 2018", 4 pgs.
"Canadian Application Serial No. 2,811,517, Office Action dated Jul. 10, 2017", 3 pgs.
"Canadian Application Serial No. 2,811,517, Response filed Jan. 9, 2018 to Office Action dated Jul. 10, 2017", 12 pgs.
"Draft_proposedAmendment_for _Exam inersAmendment_ 12860700", 7 pgs.
"European Application Serial No. 11818901.8, Extended European Search Report dated Nov. 17, 2016", 11 pgs.
"European Application Serial No. 11818901.8, Response filed Jan. 8, 2014 to Communication pursuant to Rules 161(2) and 162 EPC dated Jul. 12, 2013", 10 pgs.
"European Application Serial No. 11825897.9, Communication dated May 3, 2013", 2 pgs.
"European Application Serial No. 11825897.9, Response filed Nov. 11, 2013 to Communication Pursuant to Rules 161(2) and 162 EPC dated May 3, 2013", 10 pgs.
"European Application Serial No. 1740931.4, Extended European Search Report dated Apr. 19, 2016", 10 pgs.
"International Application Serial No. PCT/US2011/048680, International Preliminary Report on Patentability dated Mar. 7, 2013", 6 pgs.
"International Application Serial No. PCT/US2011/048680, International Search Report dated Feb. 7, 2012", 2 pgs.
"International Application Serial No. PCT/US2011/048680, Written Opinion dated Feb. 7, 2012", 4 pgs.
"International Application Serial No. PCT/US2011/051647, International Preliminary Report on Patentability dated Mar. 28, 2013", 6 pgs.
"International Application Serial No. PCT/US2011/051647, International Search Report dated Feb. 2, 2012", 2 pgs.

(56) References Cited

OTHER PUBLICATIONS

"International Application Serial No. PCT/US2011/051647, Written Opinion dated Feb. 2, 2012", 4 pgs.

Karbassi, et al., "Vehicle Route Prediction and Time of Arrival Estimation Techniques for Improved Transportation System Management, in Intelligent Vehicles Symposium", (2003), 511-516.

* cited by examiner

CONTROLLING A THREE-DIMENSIONAL VIRTUAL BROADCAST PRESENTATION

CROSS-REFERENCE TO RELATED APPLICATIONS

The present application is a continuation and claims the priority benefit of U.S. patent application Ser. No. 14/100,985 filed Dec. 9, 2013, now issued as U.S. Pat. No. 9,448,690, which is a continuation and claims the priority benefit of U.S. patent application Ser. No. 12/398,120 filed Mar. 4, 2009, now issued as U.S. Pat. No. 8,619,072, the disclosures of which are incorporated herein by reference.

BACKGROUND OF THE INVENTION

Field of the Invention

The present invention generally relates to broadcast presentation technology. More specifically, the present invention relates to controlling a three-dimensional virtual broadcast presentation.

Description of the Related Art

Broadcast presentations such as traffic reports and weather forecasts generally include a series of maps and images referred to be a presenter can during the course of such presentations. The maps and images may be quite complex incorporating animations, three-dimensional graphics, and multimedia overlays. Transitions between the maps and images may have added effects as well.

These broadcast presentations are conventionally performed in a scripted manner. The series of maps and images referred to by the presenter are produced prior to the broadcast presentation and arranged in a fixed sequence much like a slide show. The presenter may have an ability to control progression or retrogression of the sequence, but is otherwise bound to the initially included material. As a result, the information included in the maps and images—at the time of presentation—is outdated. This outdated information can have a drastic impact on the accuracy of, for example, for traffic reports.

Existing broadcast presentation technology also lacks the ability for the presenter to interact with the maps and images during the broadcast presentation. The presenter is unable to spontaneously change a view of a particular map to investigate an area that was not a part of the original script.

There is, therefore, a need in the art for the broadcast of three-dimensional virtual presentations that can be referred to and manipulated by a user in real-time.

SUMMARY OF THE PRESENTLY CLAIMED INVENTION

Embodiments of the present invention allow a presenter to change a view of a broadcast presentation and to interact with the broadcast presentation in real-time.

In a first claimed embodiment, a method for controlling a three-dimensional virtual broadcast presentation is disclosed. The method includes generating a three-dimensional virtual broadcast presentation based on dynamic information. A signal generated by a control device maneuvered by a presenter is received, the signal reflecting positional information of the control device. Positional information of the control device may be associated with motion or attitude of the control device. A view of the three-dimensional virtual broadcast presentation is manipulated in response to the received signal, the manipulation of the virtual broadcast presentation at least partially based on positional information of the control device.

In a second claimed embodiment, a system for controlling a three-dimensional virtual broadcast presentation is disclosed. The system includes a communications module stored in memory and executable by a processor to receive a signal generated by a control device maneuvered by a presenter, the signal reflecting positional information of the control device. The system also include a presentation rendering module stored in memory and executable by a processor to generate a three-dimensional virtual broadcast presentation based on dynamic information, and manipulate a view of the three-dimensional virtual broadcast presentation. The manipulation of the virtual broadcast presentation at least partially based on positional information of the control device.

A third claimed embodiment discloses a computer readable storage medium having a program embodied thereon. The program is executable by a processor to perform method for controlling a three-dimensional virtual broadcast presentation. The method includes generating a three-dimensional virtual broadcast presentation based on dynamic information; receiving a signal generated by a control device maneuvered by a presenter, the signal reflecting positional information of the control device; and manipulating a view of the three-dimensional virtual broadcast presentation in response to the received signal, the manipulation of the virtual broadcast presentation at least partially based on positional information of the control device.

DETAILED DESCRIPTION

The present invention provides for control of a three-dimensional virtual broadcast presentation. The three-dimensional virtual broadcast presentation may include maps and images rendered in a three-dimensional manner and that can be referred to in real-time by a presenter during the broadcast presentation. The presenter may maneuver a handheld control device to manipulate a view of the three-dimensional virtual broadcast presentation. The presenter may also select interactive elements included in the three-dimensional virtual broadcast presentation using the handheld control device.

Figure 1A:
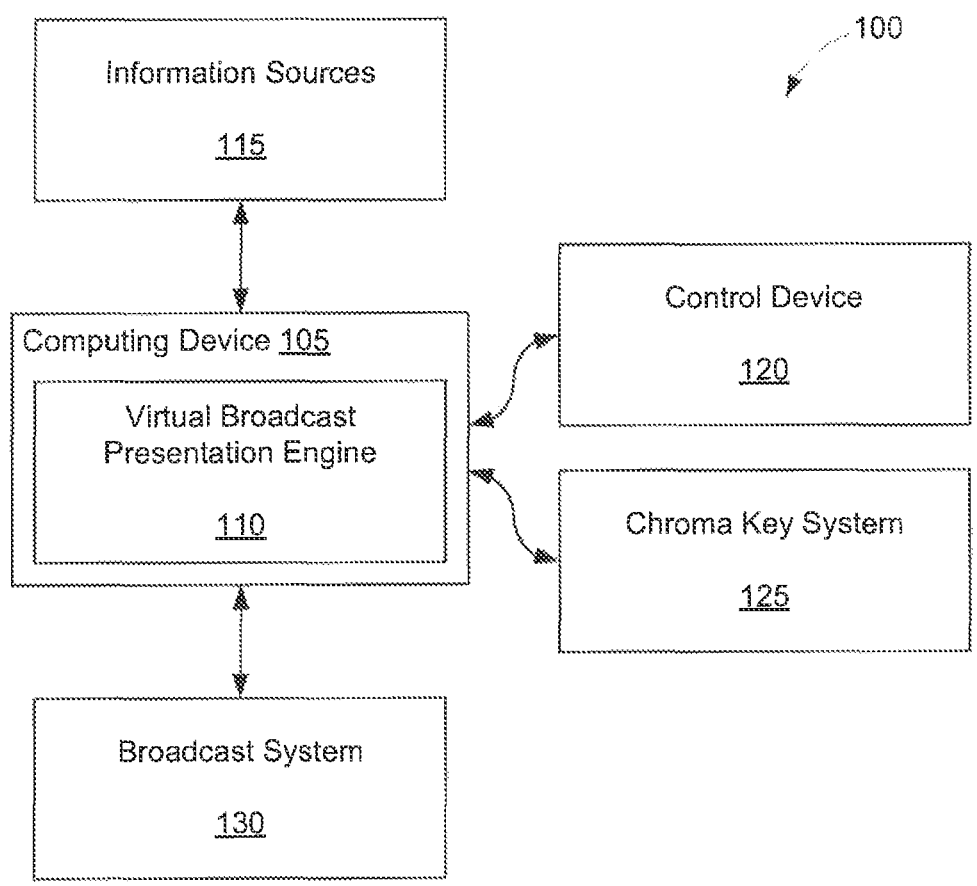
FIG. 1A is a block diagram illustrating an environment for the broadcast of three-dimensional virtual presentations that can be referred to and manipulated by a user in real-time.

Referring now to FIG. 1A, a block diagram of an environment 100 for the broadcast of three-dimensional virtual presentations that can be referred to and manipulated by a user in real-time is shown. The environment 100 of FIG. 1A includes a computing device 105 having a virtual broadcast presentation engine 110. The computing device 105 of FIG. 1A is in communication with information sources 115, a control device 120, a chroma key system 125, and a broadcast system 130. While FIG. 1A illustrates one particular environment 100 for the broadcast of a three-dimensional virtual presentation and including certain elements, alternative embodiments may be implemented that utilize differing elements than those disclosed in FIG. 1A (or combinations of the same), but that otherwise fall within the scope and spirit of the present invention.

The computing device 105 and the virtual broadcast presentation engine 110 generate a composite presentation that includes a three-dimensional virtual broadcast presentation and possibly footage of a presenter. The composite presentation may be generated using information obtained in real-time (or near real-time) from the information sources 115 and the chroma key system 125 as described in further detail below. The virtual broadcast presentation engine 110 is, in particular, discussed with respect to FIG. 2A. The computing device 105 may include various components (not depicted) such as one or more of communications interfaces, a processor, memory, storage, and any number of buses providing communication therebetween. The processor may execute instructions implemented through computing modules or engines while the memory and storage may both permanently or temporarily store data including the aforementioned modules and engines.

The information sources 115 may be provided by various organizations and in a variety of forms. The information sources 115 may include data sources related to traffic data such as traffic flow and as described in U.S. patent application Ser. No. 11/302,418 or weather data such as forecasts. The information sources 115 may also include data sources related to election results, newsworthy events or incidents, school closings, and other information that may be featured on a three-dimensional virtual broadcast presentation. The information sources 115 may require subscription or authentication for access and may be accessible via Telnet, FTP, or web services protocols. Information may be received from information sources 115 in real-time or near real-time to allow for generation of an equally real-time or near real-time presentation. That presentation may, in turn, be manipulated in real-time.

In an embodiment of the present invention utilizing traffic data specific to the San Francisco Bay area, the information sources 115 may include one or more of the 511.org system (a collaboration of public agencies including the California Highway Patrol, Metropolitan Transportation Commission, and CALTRANS), the California Highway Patrol (CHP) World Wide Web server, the PeMS system at the University of California at Berkeley, various public event listings, or a publicly or privately accessible user input mechanism. For weather data, the information sources 115 may include the National Weather Service among other weather information sources. Other data sources or alternative types of data sources (e.g., non-traffic and non-weather related sources) may be incorporated and utilized in various embodiments of the present invention.

Control device 120 may include a wireless handheld controller. The control device 120 may be in communication with the computing device 105 via a Bluetooth, WiFi, or other wireless connection. The control device 120 may sense its own motion and/or attitude. Attitude of the control device 120 describes the inclination of the principal axes of the control device 120 relative to the direction of the Earth's gravitational pull. The control device 120 may include a three-axis accelerometer that can sense orientation or changes in orientation of the control device 120 relative to the direction of the Earth's gravitational pull. The control device 120 may also be capable of sensing its own motion or attitude by detecting illumination emitted by positioned emitters. As the presenter maneuvers the control device 120 by turning, rotating, tilting, or twisting about various axes, the control device 120 generates a signal based at least partially on positional information of the control device 120. The positional information may be associated with the motion of the control device 120 or the attitude of the control device 120. A magnitude of such maneuvers of the control device 120 by the presenter may be included in the signal as described further herein. Stability control may be implemented in some embodiments of the control device 120 such that small and often unintentional motions of the control device 120 are smoothed or ignored.

The control device 120 may include other components such as buttons, switches, or triggers. Actuation of these other components may be a partial basis for any signal generated by the control device 120. Actuation of these other components may be combined with certain motions or attitudes of the control device yielding a wider variety of signal possibilities. For example, actuation of various buttons, switches, or triggers may control certain zooming functions, open or close pop-up windows in the three-dimensional virtual broadcast presentation, or obtain a default orientation of the three-dimensional virtual broadcast presentation (e.g., align the three-dimensional virtual broadcast presentation to face north). Additionally, a signal associated with positional information of the control device 120 may be sent by the control device 120 to the computing device 105 only when a particular button is depressed, in accordance with exemplary embodiments. This may be implemented as a safely feature so that the presenter cannot accidentally or automatically affect the three-dimensional virtual broadcast presentation.

The control device 120 may include various portable devices capable of detecting positional information. For example, the control device 120 may be an iTouch™ or iPhone™, both available from Apple Inc., of Cupertino, Calif. The control device 120 may also be a Wii™ Remote (sometimes referred to as a Wiimote) available from Nintendo Co., Ltd., of Kyoto, Japan. A control device similar to the Wii™ Remote is described in greater detail in U.S. patent application Ser. No. 11/532,328 filed Sep. 15, 2006 and entitled "Video Game System with Wireless Modular Handheld Controller," the disclosure of which is incorporated herein by reference.

Figure 1B:
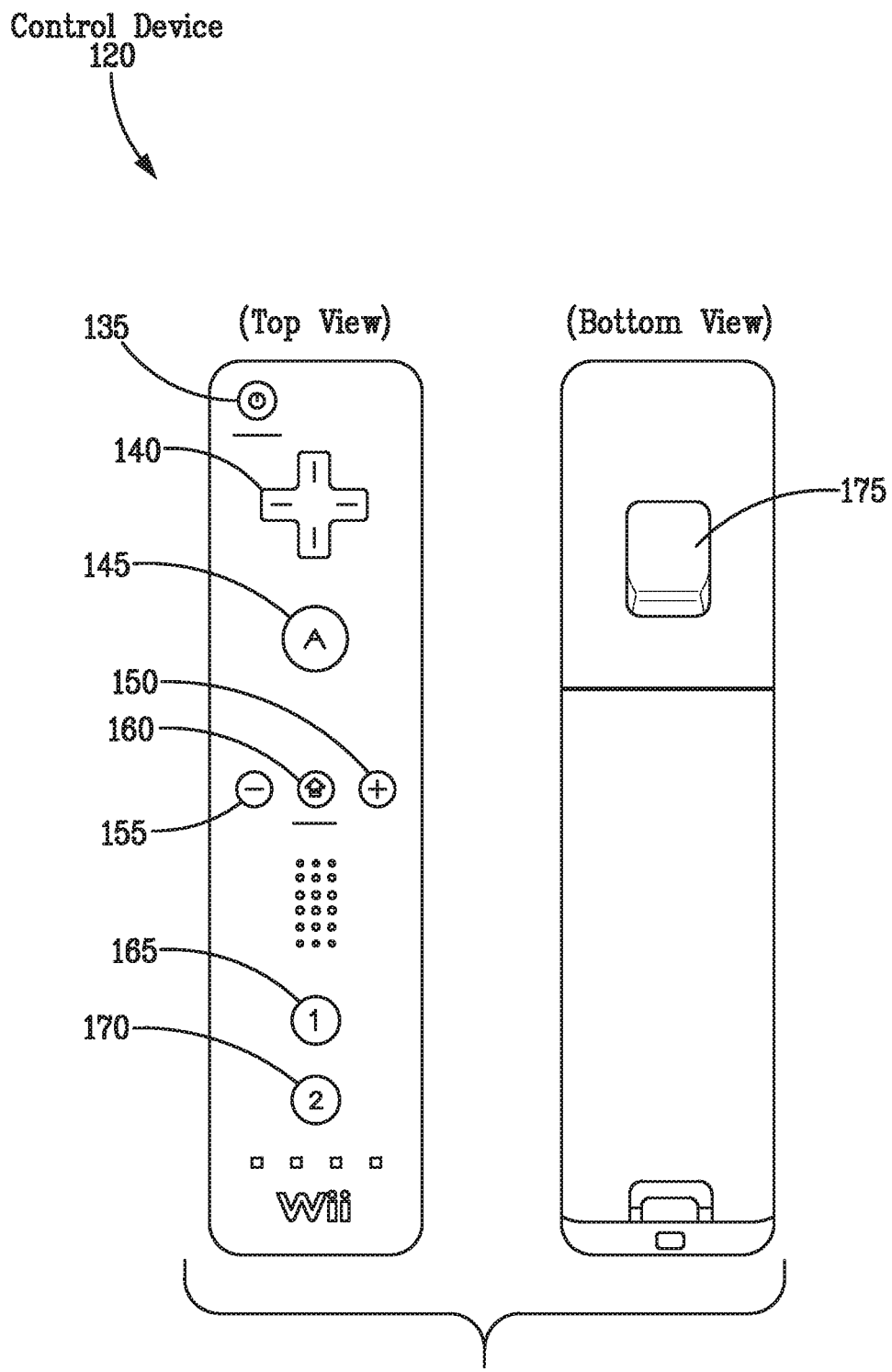
FIG. 1B illustrates an exemplary control device as referenced in FIG. 1A.

FIG. 1B illustrates an exemplary control device 120. Other devices may be used as the control device 120 in the context of the present invention. Signals may be sent by the control device 120 that correspond to positional information of the control device 120, and to actuation of buttons 135-170 and trigger 175. These signals may be configured to instruct the computing device 105 and/or the virtual broadcast presentation engine 110 to control various aspects of the three-dimensional virtual broadcast presentation. Such configuration of the signals may be customized for a specific application or to suit preferences of a specific presenter.

Actuation of the button 135 may turn on or turn off the control device 120 or another component of the environment 100. Various actuations of the directional button 140 may change a focus of the three-dimensional virtual broadcast presentation to different points of interest within the presentation. Actuation of the button 145 may control whether signals are sent that correspond to maneuvers of the control device 120. For example, signals corresponding to maneuvers of the control device 120 may be sent to the computing device 105 only when the button 145 is depressed by the presenter. Actuation of the buttons 150 and 155 may result a zoom-in or zoom-out of a view of the three-dimensional virtual broadcast presentation. Actuation of the button 160 may result in the three-dimensional virtual broadcast presentation returning to a default orientation (e.g., the three-dimensional virtual broadcast presentation being aligned to face north). Actuation of the button 170 may result in selection of interactive elements included in the three-dimensional virtual broadcast presentation. Actuation of the button 175 may cause certain elements of the three-dimensional virtual broadcast presentation to be hidden such as pop-up windows. Actuation of the trigger 175 may effectuate similar functions as actuation of the button 145.

Chroma key system 125 may be used to capture footage of the presenter that can be used as part of the composite presentation generated by the computing device 105. The chroma key system 125 may provide the presenter with a preview of the composite presentation to allow the presenter to appear as though he or she is naturally interacting with the three-dimensional virtual broadcast presentation.

Chroma key systems are well known in the art. To illustrate the basic principles of such a system, consider a weather forecast broadcast. The presenter appears to be standing in front of a large weather map. In the television studio, however, the weather map is actually a large 'blue screen.' The presenter stands in front of the 'blue screen' and the weather map is added to those parts of the image where the color is blue.

The chroma key system 125 may include a blue or green screen, a monitor meant only for viewing by the presenter and that shows the presenter 'overlaid' on the three-dimensional virtual broadcast presentation, and a camera that captures video footage of the presenter in front of the screen. Various components may be included in the chroma key system 125 depending on the particular implementation of the same.

The broadcast system 130 disseminates the composite presentation to viewers. Dissemination may occur via radio waves such as UHF or VHF, cable, satellite, or the World Wide Web. Hardware and software necessary to effectuate a broadcast may be included in the broadcast system 130 and are generally known to those skilled in the broadcasting art.

Figure 2A:
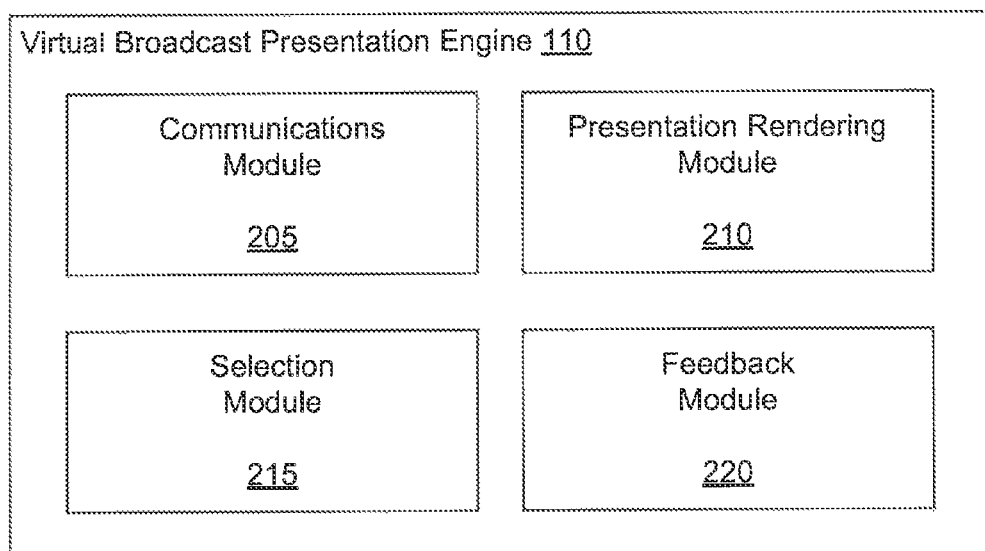
FIG. 2A is a block diagram of an exemplary virtual broadcast presentation engine.

FIG. 2A is a block diagram of the virtual broadcast presentation engine 110. The virtual broadcast presentation engine 110 of FIG. 2A includes a communications module 205, a presentation rendering module 210, a selection module 215, and a feedback module 220. The broadcast engine 110 and its constituent modules may be stored in memory and executed by a processing device to effectuate the functionality corresponding thereto. The virtual broadcast presentation engine 110 may be composed of more or less modules (or combinations of the same) and still fall within the scope of the present invention. For example, the functionality of the selection module 215 and the functionality of the feedback module 220 may be combined into a single module.

Execution of the communications module 205 allows for receipt of a signal generated by the control device 120, which may be based at least partially on the positional information of the control device 120 as maneuvered by the presenter. The signal may additionally be based on—in part or in whole—the actuation of other components included in the control device 120 such as buttons, switches, or triggers.

In addition to the signal generated by the control device 120, execution of the communications module 205 may also allow for receipt of dynamic information from the information sources 115. This dynamic information may be used by other modules for generating, manipulating, and interacting with the three-dimensional virtual broadcast presentation.

Figure 2B:
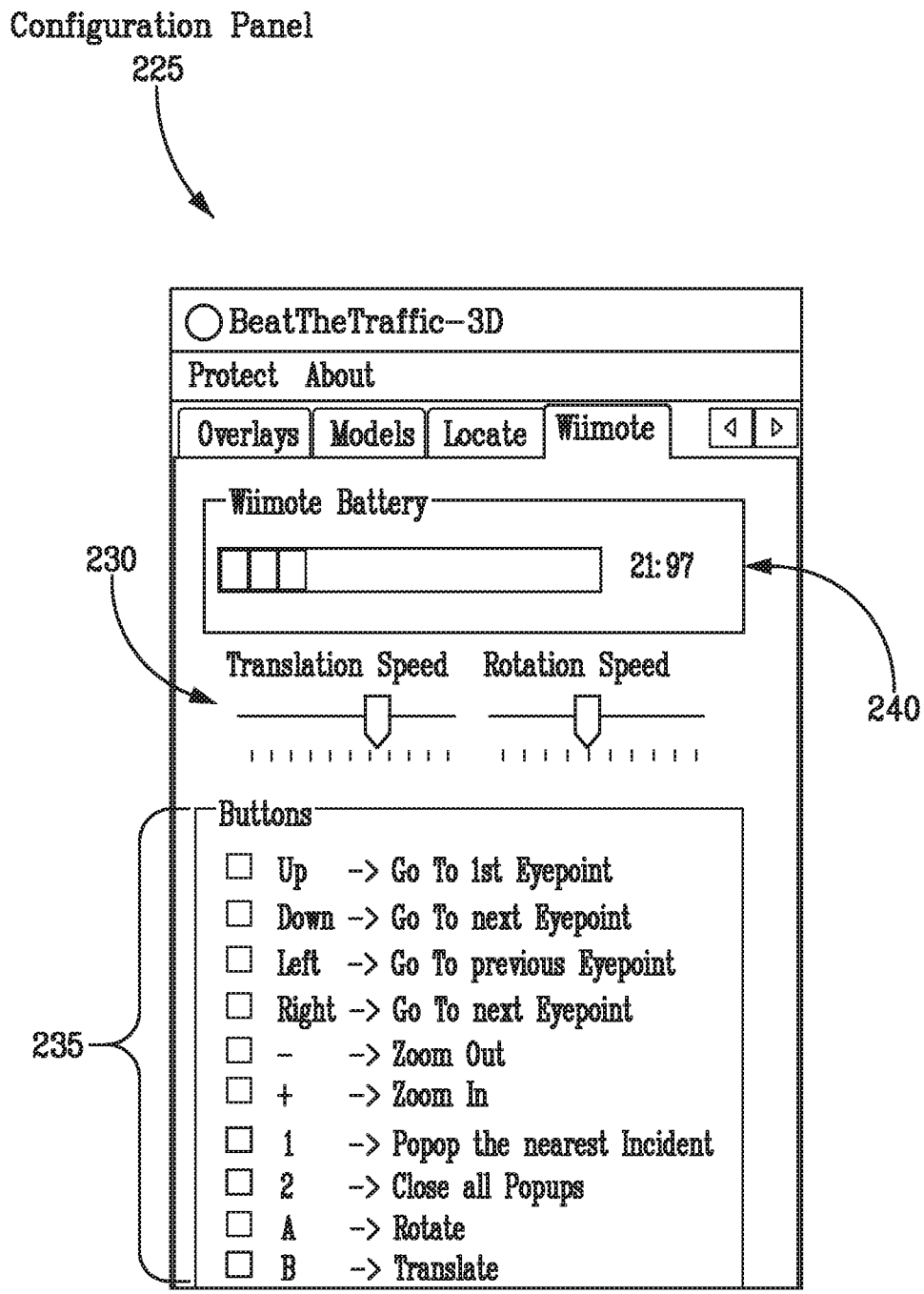
FIG. 2B illustrates an exemplary configuration panel as may be launched through execution of the virtual broadcast presentation engine of FIG. 2A.

The communications module 205 may also allow the presenter or other users to control certain aspects of the control device 120 such as how signals received from the control device 120 are interpreted by the modules of the virtual broadcast presentation engine 110. FIG. 2B illustrates an exemplary configuration panel 225. The configuration panel 225 may be accessed and manipulated by the presenter or the other users by use of components associated with the computing device 105. These components (not depicted) may include a monitor, a keyboard, a mouse, and other various peripheral devices.

As depicted, the configuration panel 225 includes sliders 230 and check boxes 235. The sliders 230 may be used to adjust sensitivity to various maneuvers of the control device 120 by the presenter. The check boxes 235 may be used to activate or deactivate various buttons included in the control device 125. The configuration panel 225 may also include status information about the control device 120. For example, as depicted, the configuration panel 225 includes a power meter 240 that may indicate a power level of batteries included in the control device 120.

Referring again to FIG. 2A, execution of the presentation rendering module 210 allows for the generation of a three-dimensional virtual broadcast presentation based on the dynamic information received through execution of the communications module 205. The dynamic information may include traffic information, weather information, election results, newsworthy events or incidents, school closings, or other information that may be featured on a three-dimensional virtual broadcast presentation.

Execution of the presentation rendering module 210 may also allow for manipulation of a view of the three-dimensional virtual broadcast presentation in response to the signal received by the communications module 205 from the control device 120. Manipulating the view of the presentation may include one or more of zooming into, panning across, rotating, or tilting the three-dimensional virtual broadcast presentation. Signals corresponding to various motions or attitudes of the control device 120 may be assigned to various other manipulations of the three-dimensional virtual broadcast presentation. For example, actuation of a trigger included in the control device 120 may affect zoom speed, whereas a certain motion or attitude of the control device 120 may affect zoom direction. Furthermore, the magnitude of the maneuvers of the control device 120 by the presenter may be included in the signal received by the communications module 205 to adjust a speed at which the view of the presentation is manipulated.

Execution of the selection module 215 allows for selection of an interactive element included in the three-dimensional virtual broadcast presentation in response to the received signal. The interactive element may represent a traffic alert. For example, if road construction is taking place at a given intersection of two streets, an icon indicative of road construction may be placed in the three-dimensional virtual broadcast presentation at a position that corresponds to that given intersection. Execution of the selection module 215 may also select the interactive element when the interactive element is positioned near the center of the three-dimensional virtual broadcast presentation.

Selecting the interactive element may cause one of a variety of responses from the three-dimensional virtual broadcast presentation. For example, if the interactive element corresponds to a traffic camera, selecting the interactive element may cause a live camera view to appear within the three-dimensional virtual broadcast presentation.

Execution of the feedback module 220 provides feedback to the presenter to inform the presenter that a given interactive element is selectable. For example, the interactive element may only be selectable in certain regions of the three-dimensional virtual broadcast presentation, such as the center. When the interactive element enters or leaves the center of the three-dimensional virtual broadcast presentation, the presenter may be informed via feedback. The feedback may include highlighting of the interactive element. To avoid distracting or otherwise undesirable imagery such as a cursor being included in the three-dimensional virtual broadcast presentation, non-visible feedback may be invoked. Examples of non-visible feedback include a vibration of the control device or an audible tone. Visible feedback mechanisms may be employed only on the monitor of the chroma key system 125, which is meant only for the presenter, while the composite presentation used by the broadcast system 130 may not include the visible feedback mechanism.

Execution of the virtual broadcast presentation engine 110 may output the three-dimensional virtual broadcast presentation to other components of the computing device 105 for generation of the composite presentation. Accordingly, the computing device 105 may output the composite presentation to the broadcast system 130 for dissemination to the views.

Figure 3:
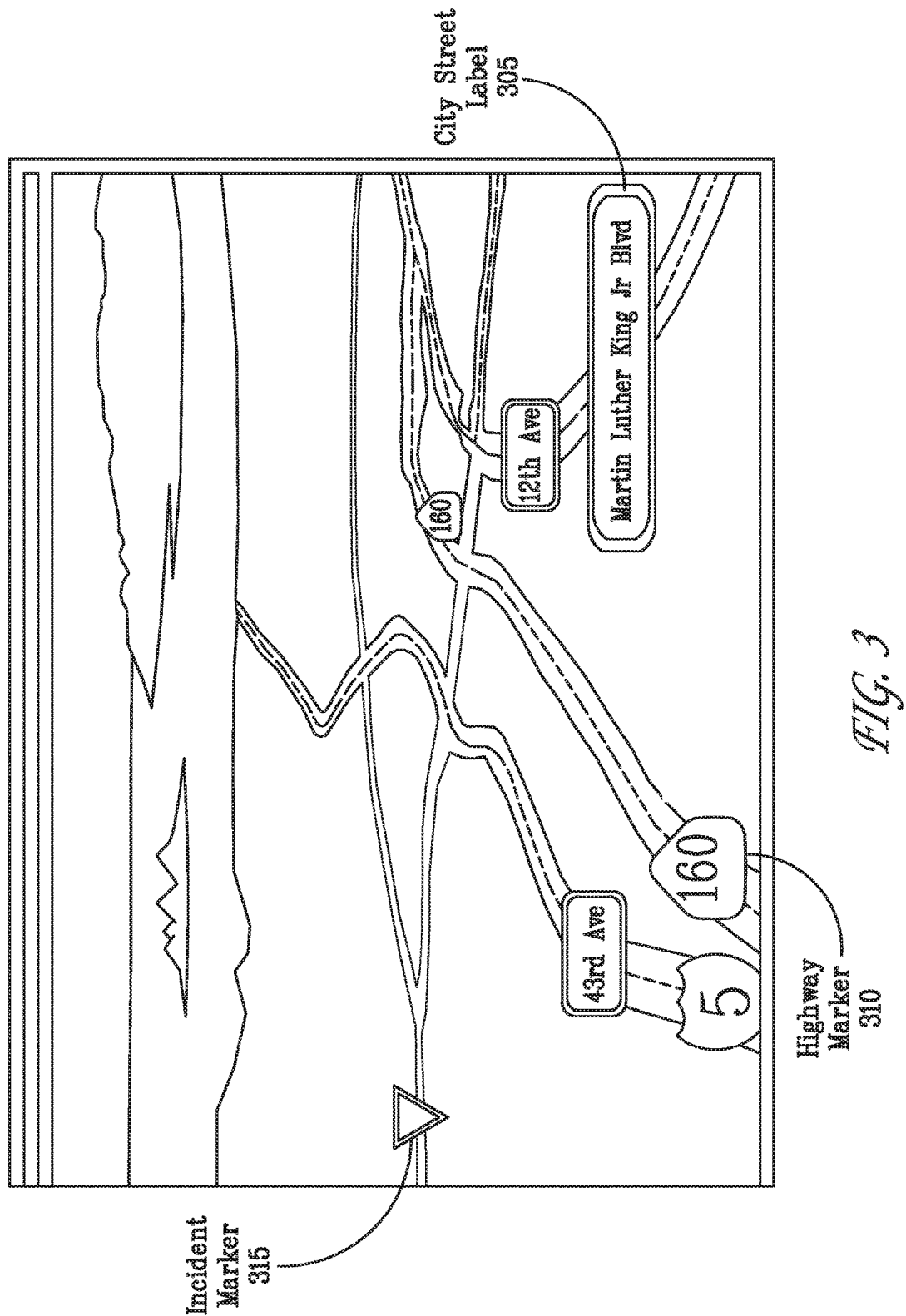
FIG. 3 illustrates an exemplary three-dimensional virtual broadcast presentation.

FIG. 3 illustrates an exemplary three-dimensional virtual broadcast presentation 300. The presentation 300 of FIG. 3 includes traffic information. The principles described herein with respect to traffic are equally applicable to embodiments of the present invention that include weather information, election results, newsworthy events or incidents, school closings, or other information that may be featured on a three-dimensional virtual broadcast presentation. The presentation 300 may be generated and manipulated by execution of the presentation rendering module 210 in real-time. Presentation 300 may include satellite images of a given area with an animated road traffic report. A detailed description of animated road traffic reports may be found in U.S. patent application Ser. No. 11/302,418, the disclosure of which has been previously incorporated by reference.

Satellite images may be manipulated by execution of the presentation rendering module 210 to aid in generating three-dimensional information. For example, two-dimensional satellite images may be processed in the context of other geographical information (e.g., topographical information) to generate a three-dimensional satellite image that reflects information along an x-, y-, and z-axis as illustrated in presentation 300. The textured three-dimensional representation of landscape of the particular urban area aligns with and provides the three-dimensional coordinates for the road ways that may be animated and overlain on the satellite images.

The presentation 300 may also include a variety of markers such as city street labels 305, exit labels, nicknamed sections of highways, or city streets. These markers may be readily recognizable, such as a highway marker 310 resembling a California state highway sign with the appropriate highway number applied to the sign. Presentation 300 may include markers or icons that correspond to the location of traffic incidents, road construction, and traffic cameras such as incident marker 315. Some or all of these markers may be interactive elements of the three-dimensional virtual broadcast presentation 300. Accordingly, the interactive elements may be selected by the presenter using the control device 120. When an interactive element is selected, additional information related to that interactive element may be displayed within the presentation 300. In one example, an interactive element marking a traffic incident may be selected resulting in detailed textual information describing that traffic incident being displayed.

A view of the presentation 300 may be manipulated to give the effect of 'flying' through the three-dimensional virtual representation of the urban area by a combination of zooming, panning, tilting, and/or rotating the view. For example, as the presenter rotates the control device 120, the control device 120 generates a corresponding signal that is received in conjunction with execution of the communications module 205. In turn, the presentation rendering module 210 is executed to rotate the presentation 300 a corresponding amount as the presenter rotated the control device 120. This correspondence of the presentation 300 to manipulation of the control device 120 gives the presenter the sensation of directly controlling the presentation 300. Such manipulation of the view may also be used in selecting interactive elements. For example, if a particular interactive element may be selected only when near the center of the presentation 300, the presenter may cause the view to be manipulated such that that particular interactive element is centered and therefore selectable.

Figure 4:
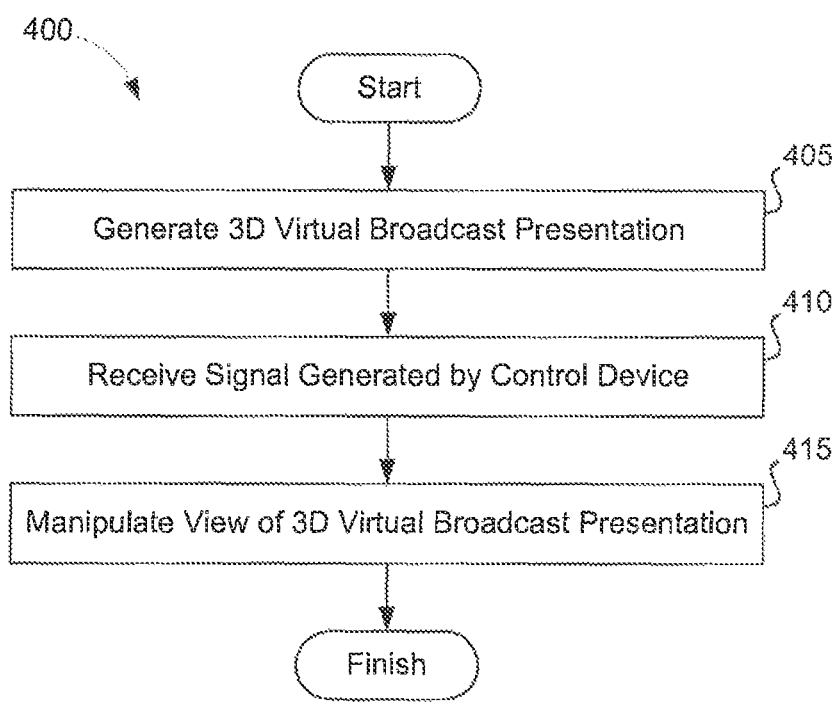
FIG. 4 is a flowchart illustrating an exemplary method for controlling a three-dimensional virtual broadcast presentation.

FIG. 4 is a flowchart illustrating an exemplary method 400 for controlling a three-dimensional virtual broadcast presentation. The steps of method 400 may be performed in varying orders. Steps may be added or subtracted from the method 400 and still fall within the scope of the present invention.

In step 405, a three-dimensional (3D), real-time, virtual broadcast presentation is generated. The presentation may be based on dynamic information. Execution of the presentation rendering module 210 may perform step 405. The dynamic information may include real-time traffic information or real-time weather information and be received in conjunction with execution of the communications module 205 from the information sources 115.

In step 410, a signal may be received that is generated by the control device 120 maneuvered by a presenter. Step 410 may be performed by execution of the communications module 205. The signal may be based at least partially on positional information of the control device 120. The signal may also be based at least partially on actuation of other components such as buttons, switches, or triggers of the control device 120. Receipt of the signal in step 410 allows for real-time manipulation of the presentation in step 415.

In step 415, a view of the three-dimensional virtual broadcast presentation is manipulated in real-time and in response to the signal received in step 410. Execution of the presentation rendering module 210 may perform step 415. Real-time manipulation of presentation and various views thereof may include one or more of zooming into, panning across, tilting, or rotating the three-dimensional virtual broadcast presentation.

Any number of additional and/or optional steps that are not otherwise depicted may be included in method 400. These steps may include one or more of an interactive element included in the three-dimensional virtual broadcast presentation being selected using the control device 120 or feedback being provided to the presenter to inform the presenter that an interactive element is selectable.

It is noteworthy that any hardware platform suitable for performing the processing described herein is suitable for use with the invention. Computer-readable storage media refer to any medium or media that participate in providing instructions to a central processing unit (CPU) for execution. Such media can take forms, including, but not limited to, non-volatile and volatile media such as optical or magnetic disks and dynamic memory, respectively. Common forms of computer-readable storage media include a floppy disk, a flexible disk, a hard disk, magnetic tape, any other magnetic medium, a CD-ROM disk, digital video disk (DVD), any other optical medium, RAM, PROM, EPROM, a FLASHEPROM, any other memory chip or cartridge.

Various forms of transmission media may be involved in carrying one or more sequences of one or more instructions to a CPU for execution. A bus carries the data to system RAM, from which a CPU retrieves and executes the instructions. The instructions received by system RAM can optionally be stored on a fixed disk either before or after execution by a CPU.

While various embodiments have been described above, it should be understood that they have been presented by way of example only, and not limitation. The descriptions are not intended to limit the scope of the invention to the particular forms set forth herein. Thus, the breadth and scope of a preferred embodiment should not be limited by any of the above-described exemplary embodiments. It should be understood that the above description is illustrative and not restrictive. To the contrary, the present descriptions are intended to cover such alternatives, modifications, and equivalents as may be included within the spirit and scope of the invention as defined by the appended claims and otherwise appreciated by one of ordinary skill in the art. The scope of the invention should, therefore, be determined not with reference to the above description, but instead should be determined with reference to the appended claims along with their full scope of equivalents.

What is claimed is:

1. A method for controlling a three-dimensional virtual broadcast presentation, the method comprising:
    processing two-dimensional images in a context of geographical information in real-time to generate a three-dimensional virtual broadcast presentation;
    displaying traffic-based information, obtained from a plurality of different data sources, on the generated three-dimensional virtual broadcast presentation via a set of traffic icons;
    manipulating a view of the three-dimensional virtual broadcast presentation in real-time in response to user input from a controller;
    displaying the manipulated view of the three-dimensional virtual broadcast presentation based on the user input from the controller;
    detecting whether a subset of the set of traffic icons, currently selectable by a user in the displayed manipulated view of the three-dimensional virtual broadcast, enters a center region of the three-dimensional virtual broadcast presentation;
    generating a feedback for the user in response to the subset of traffic icons entering the center region of the three-dimensional virtual broadcast presentation, the feedback specifying that the subset of the set of traffic icons is currently selectable by the user, in the displayed manipulated view of the three-dimensional virtual broadcast, via the controller;
    receiving user input regarding selection of a traffic icon in the subset of traffic icons associated with the generated feedback; and
    displaying additional information related to the traffic icon in response to receiving the user input regarding selection of the traffic icon, wherein selection of any of the set of traffic icons not included by the subset of traffic icons does not cause display of additional information.

2. The method of claim 1, wherein the generated feedback includes highlighting the subset of traffic icons on the displayed manipulated view of the three-dimensional virtual broadcast.

3. The method of claim 1, wherein the generated feedback includes an audible tone used to indicate that the subset of traffic icons on the displayed manipulated view of the three-dimensional virtual broadcast is selectable.

4. The method of claim 1, wherein the generated feedback includes a vibration of the controller indicating that the subset of traffic icons on the displayed manipulated view of the three-dimensional virtual broadcast is selectable.

5. The method of claim 1, wherein the generated feedback is provided only to the user and not to viewers of the three-dimensional virtual broadcast presentation.

6. The method of claim 1, wherein the generated feedback is associated with one or more regions of the three-dimensional virtual broadcast presentation.

7. The method of claim 6, wherein the one or more regions comprise the center region of the three-dimensional virtual broadcast presentation.

8. A non-transitory computer-readable storage medium, having embodied thereon a program executable by a processor to perform a method for controlling a three-dimensional virtual broadcast presentation, the method comprising:
    processing two-dimensional images in a context of geographical information in real-time to generate a three-dimensional virtual broadcast presentation;
    displaying traffic-based information obtained from a plurality of different data sources on the generated three-dimensional virtual broadcast presentation via a set of traffic icons;
    manipulating a view of the three-dimensional virtual broadcast presentation in real-time in response to user input from a controller;
    displaying the manipulated view of the three-dimensional virtual broadcast presentation based on the user input from the controller;
    detecting whether a subset of the set of traffic icons, currently selectable by a user in the displayed manipulated view of the three-dimensional virtual broadcast, enters a center region of the three-dimensional virtual broadcast presentation;
    generating a feedback for the user in response to the subset of traffic icons entering the center region of the three-dimensional virtual broadcast presentation, the feedback specifying that a subset of the set of traffic icons is currently selectable by the user, in the displayed manipulated view of the three-dimensional virtual broadcast, via the controller;
    receiving user input regarding selection of a traffic icon in the subset of traffic icons associated with the generated feedback; and
    displaying additional information related to the traffic icon in response to receiving the user input regarding selection of the traffic icon, wherein selection of any of the set of traffic icons not included by the subset of traffic icons does not cause display of additional information.

9. The non-transitory computer-readable storage medium of claim 8, wherein the generated feedback includes highlighting the subset of traffic icons on the displayed manipulated view of the three-dimensional virtual broadcast.

10. The non-transitory computer-readable storage medium of claim 8, wherein the generated feedback includes an audible tone used to indicate that the subset of traffic icons on the displayed manipulated view of the three-dimensional virtual broadcast is selectable.

11. The non-transitory computer-readable storage medium of claim 8, wherein the generated feedback includes a vibration of the controller indicating that the subset of traffic icons on the displayed manipulated view of the three-dimensional virtual broadcast is selectable.

12. The non-transitory computer-readable storage medium of claim 8, wherein the generated feedback is provided only to the user and not to viewers of the three-dimensional virtual broadcast presentation.

13. The non-transitory computer-readable storage medium of claim 8, wherein the generated feedback is associated with one or more regions of the three-dimensional virtual broadcast presentation.

14. The non-transitory computer-readable storage medium of claim 13, wherein the one or more regions comprise the center region of the three-dimensional virtual broadcast presentation.

15. A system for controlling a three-dimensional virtual broadcast presentation, the system comprising:
   a control device; and
   a computing device communicatively coupled to the control device, the computing device including a processor and memory storing:
      communication module, wherein the communication module manipulates a view of the three-dimensional virtual broadcast presentation in real-time in response to user input from the control device;
      a feedback module, wherein the feedback module:
         detects whether a subset of the set of traffic icons, currently selectable by a user in the displayed manipulated view of the three-dimensional virtual broadcast, enters a center region of the three-dimensional virtual broadcast presentation; and
         generates a feedback for the user in response to the subset of traffic icons entering the center region of the three-dimensional virtual broadcast presentation, the feedback specifying a set of traffic icons that are currently selectable by the user in a displayed manipulated view of the three-dimensional virtual broadcast; and
      a presentation rendering module, wherein the presentation rendering module is executable by the processor to:
         process two-dimensional images in a context of geographical information in real-time to generate a three-dimensional virtual broadcast presentation;
         display the manipulated view of the three-dimensional virtual broadcast presentation based on the user input from the controller;
         receive user input regarding selection of a traffic icon of the set of traffic icons associated with the generated feedback; and
         display additional information related to the traffic icon in response to receiving the user input regarding selection of the traffic icon, wherein selection of any traffic icon not included by the set of traffic does not cause display of additional information.

16. The system of claim 15, wherein the generated feedback includes highlighting the subset of traffic icons on the displayed manipulated view of the three-dimensional virtual broadcast.

17. The system of claim 15, wherein the generated feedback includes an audible tone used to indicate that the subset of traffic icons on the displayed manipulated view of the three-dimensional virtual broadcast is selectable.

18. The system of claim 15, wherein the generated feedback includes a vibration of the controller indicating that the subset of traffic icons on the displayed manipulated view of the three-dimensional virtual broadcast is selectable.

19. The system of claim 15, wherein the generated feedback is provided only to the user and not to viewers of the three-dimensional virtual broadcast presentation.

20. The system of claim 15, wherein the generated feedback is associated with one or more regions of the three-dimensional virtual broadcast presentation.

* * * * *